United States Patent [19]

Dugdale et al.

[11] Patent Number: 5,128,982
[45] Date of Patent: Jul. 7, 1992

[54] ELECTRONIC APPARATUS FOR "HANDS OFF" CONTROL OF A VOICE MAIL SYSTEM

[76] Inventors: William P. Dugdale, 4450 E. 56th St., Indianapolis, Ind. 46220; J. Carl Vandivier, III, 1832 Cholla Ter., Indianapolis, Ind. 46240; Larry G. Durkos, 95 S. 400 W., Lebanon, Ind. 46052

[21] Appl. No.: 516,344

[22] Filed: Apr. 30, 1990

Related U.S. Application Data

[63] Continuation-in-part of Ser. No. 388,011, Jul. 31, 1989, Pat. No. 5,048,074.

[51] Int. Cl.$^5$ .................. H04M 1/00; H04M 3/50
[52] U.S. Cl. ............................. 379/89; 379/67; 379/360; 379/442
[58] Field of Search .............. 379/89, 88, 67, 75, 379/69, 360, 361, 442; 369/25, 29, 28

[56] References Cited

U.S. PATENT DOCUMENTS

| | | | |
|---|---|---|---|
| 3,895,189 | 7/1975 | Matz | 379/75 |
| 4,371,752 | 2/1983 | Matthews et al. | 379/89 |
| 4,468,751 | 8/1984 | Plunkett, Jr. | 364/900 |
| 4,488,274 | 10/1984 | Plunkett, Jr. | 369/24 |
| 4,640,991 | 2/1987 | Matthews et al. | 379/88 |
| 4,658,097 | 4/1987 | D'Agosto, III et al. | 379/75 |
| 4,677,658 | 6/1987 | Kolodny et al. | 379/75 |
| 4,719,647 | 1/1988 | Theis et al. | 379/68 |
| 4,761,807 | 8/1988 | Matthews et al. | 379/89 |
| 4,860,339 | 8/1989 | D'Agosto, III et al. | 379/67 |

Primary Examiner—Thomas W. Brown
Attorney, Agent, or Firm—Woodard, Emhardt, Naughton, Moriarty & McNett

[57] ABSTRACT

An apparatus for "hands off" control of a Voice Mail System over a telephone line by a user to allow the user to simultaneously perform other functions such as manually processing the "oral mail" to take notes, do data entry or the like. The apparatus includes a foot pedal that is wired with switches. The foot pedal switches are connected through an interface circuit to a DTMF tone generator or a generator of digital signals corresponding to VMS functions. The interconnection is such that depending upon the pedal activated a different tone or digital signal will be generated. The user can readily reconnect the interface to vary the signal to pedal correspondence for changes in Voice Mail Systems or to implement other Voice Mail System commands. The DTMF tone generator is connected in series between the hand set and base set of a telephone so that system can be readily connected to an existing telephone and so that the tones can be sent over the phone line to a Voice Mail System. An alternate embodiment includes a microcontroller for sensing switch closures and responding with DTMF tones or sequences of DTMF tones and pauses. User programmable softkeys enable the user to preprogram DTMF sequences which are repeatedly used to control the VMS. The user programmable features of the alternate embodiment provide a more flexible device capable of interfacing with and controlling a variety of VMS devices wherein the VMS devices respond to different DTMF control signal tones or sequences of tones and pauses.

18 Claims, 15 Drawing Sheets

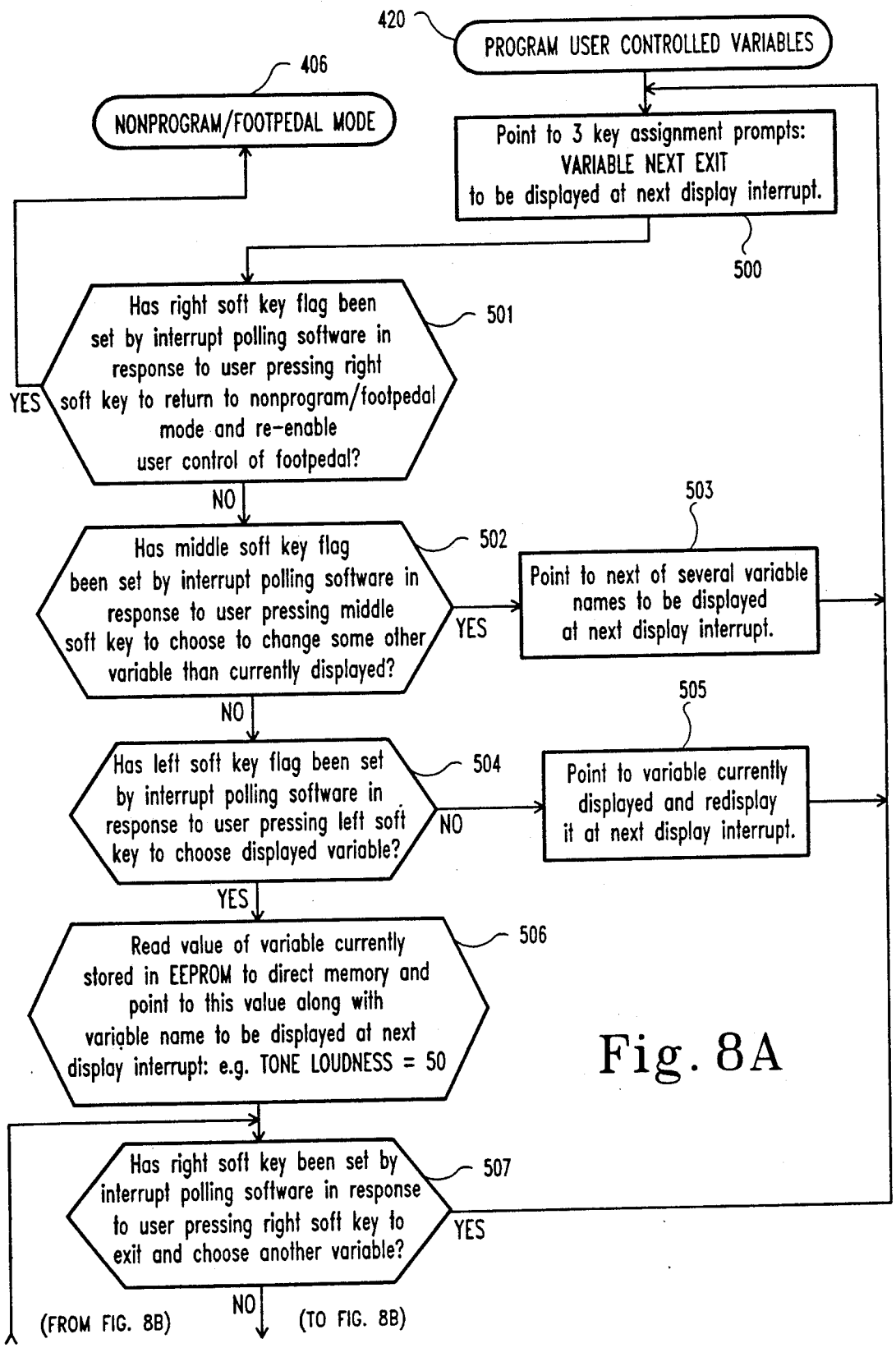

ELECTRONIC APPARATUS FOR "HANDS OFF" CONTROL OF A VOICE MAIL SYSTEM

REFERENCE TO RELATED APPLICATIONS

This application is a continuation-in-part of copending patent application Ser. No. 388,011 filed Jul. 31, 1989, U.S. Pat. No. 5,048,.

BACKGROUND OF THE INVENTION

1. Field of the Invention

The field of this invention is Voice Mail Systems and the manual processing of messages stored in a Voice Mail System, and more particularly the remote control of a Voice Mail System by an apparatus that allows the user to both remote control the Voice Mail System while making practical for the user to manually process and/or listen to messages stored in a Voice Mail System.

2. Background of the Prior Art

Voice Mail Systems (hereinafter "VMS") are a powerful communications tool in the business world. Essentially, a VMS is an invention which mates telephone and computer technology to create a system of "oral mail" over the phone lines that is analogous to and often more powerful than the standard "written mail" system. A user of a VMS can use their telephone to call the VMS and leave oral messages as "oral mail." The VMS retains the "oral mail" in a computer memory. Among other things, the user can then instruct the VMS through a telephone to deliver the "oral mail" through telephone lines to one or more intended recipients.

The following U.S. Patents generally describe some of the features and attributes that are available in and that constitute a Voice Mail System: U.S. Pat. No. 4,371,752 to Matthews et al. issued in 1983; U.S. Pat. No. 4,640,991 to Matthews et al. issued in 1987; and U.S. Pat. No. 4,761,807 to Matthews et al. issued in 1988. As shown in U.S. Pat. No. 4,371,752 a VMS can have, among others, the following attributes (1) Subscribers within the system can deposit a verbal message by using their telephone to call a "central telephone office" to deposit the "oral mail" in computer memory and select the addressees to receive the message; (2) The user depositing a message in the system may provide the system through their telephone with a number of addresses for automatic delivery of the stored message without requiring any further time by the user sending the message; (3) The system may require the user to enter an authorization code through their telephone which is checked for validity prior to accessing the message deposit function of the system; (4) After receipt of each message, the recipient is provided with means to instruct the system over their telephone to redirect the message, reply to the message by depositing a message of his own, store the message in a verbal file folder, acknowledge message receipt or save the message for a predetermined period of time; (5) The system also enables the user to use their telephone to control the retention and playback of the "oral mail" voice messages.

Typically, the features of a VMS are controlled by executing a sequence of Dual Tone Multifrequency (hereinafter referred to as DTMF) signals from a "Touch tone" type telephone. Each VMS is designed by its manufacturer to be controlled by varying sequences of DTMF signals from the user. For example, a sequence of tones and pauses might start playing a message, skip back 10 seconds, skip back to the beginning, skip forward 10 seconds, skip back to the beginning, skip forward 10 seconds, skip forward to the end of the message, or stop playing a message. Each manufacturer assigns its own communications standards which relate which touch tone signals or DTMF signals correspond to which functions of the VMS. Subscribers are provided with the proper dictionary of signals to function. VMS are thus a very useful means of conveying and retaining oral information. Moreover, much of the intent and focus of VMS is to remove the need for the generation of documents for the purpose of communication with others.

In practical application of VMS users often wish to manually process all of the "oral mail" or some of the information conveyed in the "oral mail" into a written document. Typically, this manual processing is accomplished by a person having the responsibility of listening to the VMS "oral mail" and then preparing a written document or other notation. Among, but not limited to, the forms of manual processing are data entry into a computer, shorthand, note taking, filling out of forms based upon the information in the oral mail, and/or word processing. Because control of the VMS is accomplished through the touch tone keypad of a telephone, the user would have to manually shift back and forth from their manual processing of the information, such as data entry into a computer's keyboard, to the telephone pad in order to accomplish their task. Such manual transferring back and forth is cumbersome, inefficient and can result in error. Pressing the appropriate button of the telephone keypad is even more cumbersome for a user who is simultaneously trying to perform some other task requiring the use of their hands.

The present invention provides a solution whereby the user can control the VMS with a "hands off" control of the plurality of features available from a VMS, while at the same time processing the "oral mail." The applicant is of the belief that he is the first to design a system that allows such "hands off" control of the particular features of a VMS while allowing the user to perform other manual tasks for processing the information in the VMS's "oral mail."

U.S. Pat. No. 4,677,658 to Kolodny et al. issued in 1987, illustrates a telephone handset which has five buttons on the back and sides of the handset. The buttons of Kolodny correspond to the "record," "playback," "forward," and "rewind," functions that are part of a dictation machine. Kolodny discloses that the buttons are intended to be on the telephone handset so that the user can make a phone call to a remote dictation machine and perform the function of giving dictation. Kolodny does not solve the problem of unencumbering manual processing of VMS "oral mail." Kolodny does not even discuss VMS. With Kolodny the operator must still use their hands to control the push buttons that emit the tone bursts and simultaneously attempt transcription of standard dictation. Kolodny thus teaches away from a "hands off" control of VMS.

U.S. Pat. No. 4,658,097 to D'Agosto III et al., issued in 1987 and assigned to Dictaphone Corporation, discloses the use of a foot pedal with a telephone to remotely control a specific dictation apparatus through specific DTMF tone signals transmitted into the telephone by pressing the foot pedal to control the normal "dictation" functions associated with analog tape dictation equipment of "playback," "fast-forward" and "rewind." The playback of "oral mail" in a VMS system is digital and therefore will have features such as "skip back to the beginning," "skip back" a defined amount, "skip forward" a defined amount, or simultaneously play the "oral mail" to more than one location. The features of a VMS are thus different from a standard dictation machine.

The dictation technology of D'Agosto III is designed for use with the standard dictation machines that respond to the few simple and predetermined tones needed for dictation, a tone for playback, a tone for rewind, and a tone for fast-forward. D'Agosto III thus discloses the hard wiring of one digit tones through the foot pedal that are compatible with a standard dictation machine's functions. D'Agosto does not discuss VMS or indicate that its technology should be used to control the functions of a VMS instead of a dictation machine.

In a VMS, the required number of ordered tones necessary to invoke a particular function varies from one manufacturer to another. Also, some systems allow the user to define their own "menu" of tone prompts for particular purposes, such as polling surveys. In any case there is a plurality of tones, tone order, and pauses between tones that are necessary to actuate the plurality of voice mail systems functions available from any of the several voice mail systems in use today. The one digit control of D'Agosto III directly associated with the functions of a normal dictation machine do not directly address the tone control requirements of VMS. D'Agosto does not directly mention or suggest that it is usable with VMS. Further, prior to the present invention, a "hands off" system for manual processing of VMS "oral mail" did not exist to the applicant's knowledge despite the existence of the disclosure of D'Agosto III.

SUMMARY OF THE INVENTION

The present invention provides an apparatus for remote "hands off" control of the message delivery or other functions of a Voice Mail System (VMS) for the simultaneous manual processing of the "oral mail" of a VMS. The present invention is a foot pedal (or other "hands off" switching) controlled DTMF tone generating device which is placed in series with a telephone set and telephone handset; thereby allowing the user to control a locally or remotely located VMS by depressing foot pedal switches that transmit control DTMF tones into the telephone line to be received by the VMS; where those tones correspond to the appropriate corresponding VMS functions.

In a first embodiment of the present invention the user issues the particular tones over a telephone line necessary to control a remote VMS by selecting one of three foot pedal switches. Each of the three foot pedal switches is definable by the user to emit any of the 12 DTMF tones that will correspond to the particular VMS to which the user has subscribed. The present invention provides the user with "hands off" control of a VMS through control of, which pedal relates to which tone, which tones are transmitted, the order of the tones, and the pauses between tones.

The invention also provides the user with control of many of the varied VMS functions and attributes allowing greater usage and versatility of VMS's. With the present invention the user is able to control the VMS with "hands off" operation while the user is also conveying oral mail with the message deposit function, manually processing with the message delivery function, accessing voice database information employing the user changeable group codes function, responding to an interactive voice message query to enter routing sales information, purchase orders, etc., from the Interactive Voice Response (IVR) function, accessing a particular list from a voice database employing the User Changeable Group Codes Function, or interacting with any of the many other features available from a commercial VMS.

The first embodiment of the invention is coupled to the telephone between the telephone handset and the telephone set. The "tip" and "ring" of the telephone line is readily accessed for foot pedal transmission of DTMF control tones. With this coupling location, the user also receives stored voice transmissions from the voice mail systems or transmit voice messages to the voice mail systems through the user's telephone handset. Moreover, this coupling location enables the first embodiment of the present invention to connect to most standard telephone sets that are already in place.

The first embodiment according to the present invention provides a means for a user to readily reconfigure each foot pedal switch to a chosen DTMF tone. Different VMS systems will have different tone to function correlations. With the present invention the user is able to reconfigure the apparatus to change from one VMS to another VMS with different tone to function correlations. Also a user may wish to control different VMS functions in a "hands off" manner at different times. The user will reconfigure the foot pedal switches to control other features on the same VMS or a different VMS with dissimilar control tones by assigning the different foot pedal switches to different tones.

According to another aspect of the present invention, a second embodiment is built around a microcontroller platform that links and controls telephone set and handset interface circuitry, footpedal switches, a DTMF generator, an LCD display, a DTMF keypad, and user programmable softkeys. This embodiment gives the user softkey selectable control of the sequence of tones, pauses, and tone speeds that can be transmitted from each of the footpedal switches. The second embodiment also gives the user softkey selectable control over the telephone interface circuitry, including multiplexer control of the line connection to the telephone handset and the telephone set, control over the impedance of the connection, and control of the gain of emitted DTMF tone signals, all of which allow a user to connect the footpedal DTMF tone emitting system to a multiplicity of telephone sets.

The second embodiment of the present invention allows the user to issue the particular tones over a telephone line necessary to control a remote Voice Mail System by selecting one of three footpedal switches. Each footpedal switch can be defined by the user to emit a sequence of DTMF tones and pauses. Thus the user can generate one of several sequences of tones and pauses between tones by selectively depressing one of several footpedal switches.

Some of the objects and advantages of the present invention have been discussed above. Other objects and advantages of the present invention are discernable from the description of the preferred embodiment that follows.

DESCRIPTION OF THE PREFERRED EMBODIMENT

Figure 1:
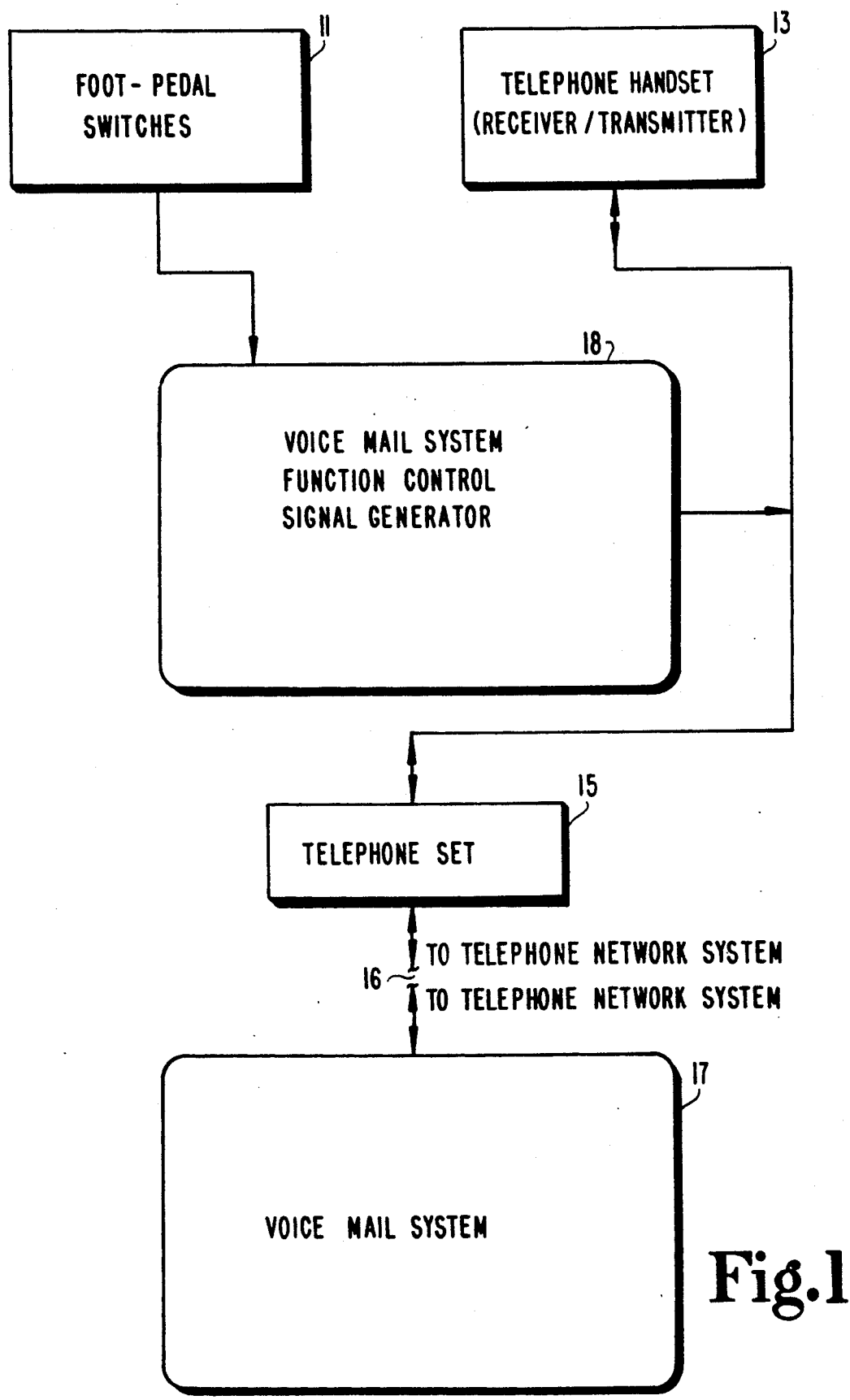
FIG. 1 is a block diagram illustrating the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such equivalents, alterations and further modifications to the illustrated device, and such further applications of the principles of the invention as illustrated therein being contemplated as would normally occur to one skilled in the art to which the invention relates.

Figure 2:
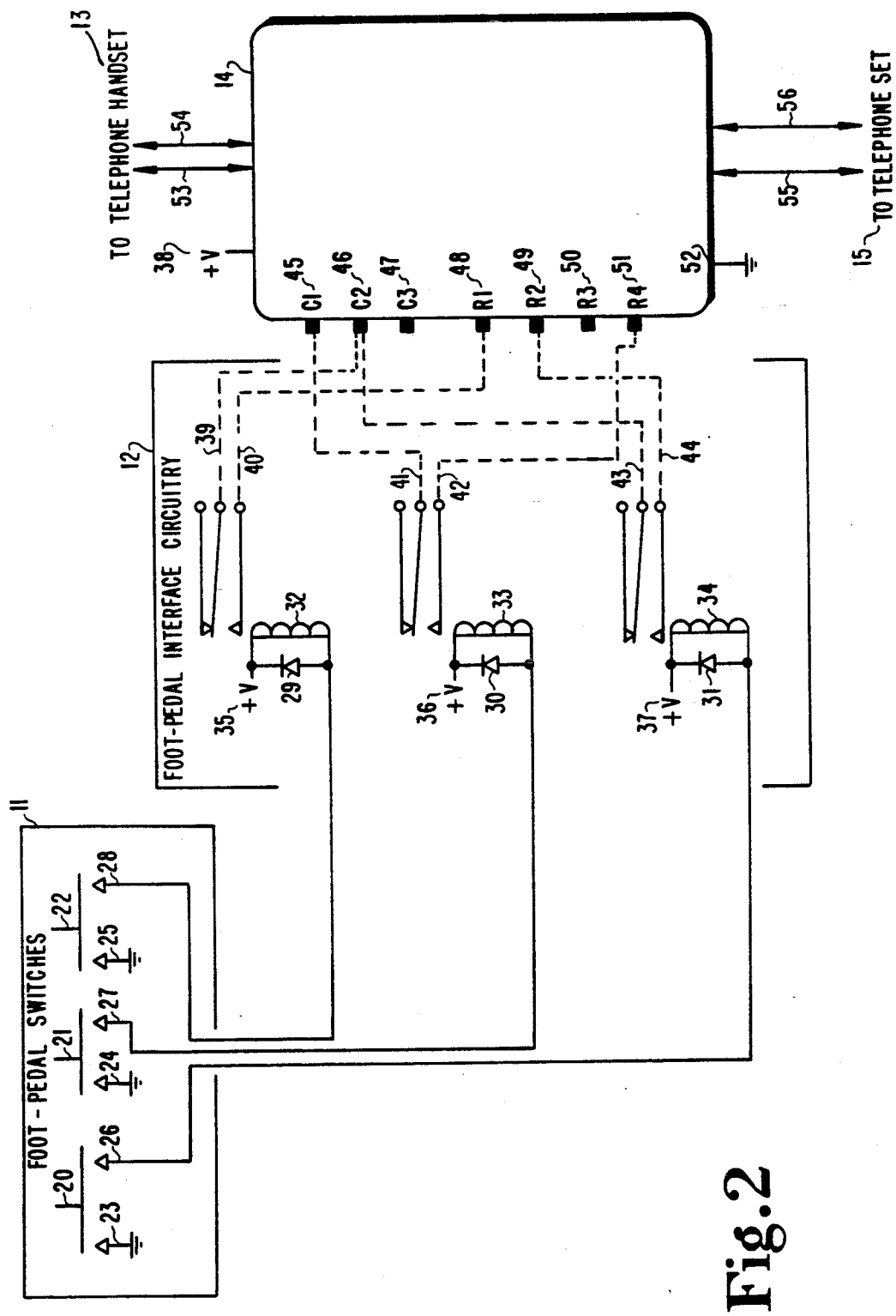
FIG. 2 is a partial schematic of the foot pedal interface circuitry and its connections to the foot pedal switches and DTMF generating, and telephone interface circuitry provided for by the preferred embodiment of the present invention.

The preferred embodiment of the present invention enables an operator to control a Voice Mail System (hereinafter referred to as VMS) by a means that frees the user's hands for other tasks. Particularly, and referring to FIG. 1, the preferred embodiment implements the foot pedal 11 control of a VMS 17 by electronically interfacing the foot pedal switches 11 through a voice mail system function control signal generating circuitry 18 which effectively translates, as described hereafter, the actuation of a particular foot pedal to the output of a particular voice mail system control signal which corresponds to a particular voice mail function. In the preferred embodiment the voice mail system function control signal generating circuitry 18 has a foot pedal interface circuitry 12 connected to a dual tone multifrequency (herein referred to as DTMF) tone generator and telephone interface circuitry 14 as shown in FIG. 2. This combined circuitry (i.e. 11, 12 and 14) is electronically coupled together between a telephone set 15 and telephone handset 13 to enable a user through the handset 13 to receive or transmit voice messages or to enable the user by pressing foot pedal 11 to initiate transmission of control tones through any telephone network system 16 that can be used to connect a telephone set 15 to a VMS 17.

The telephone network system 16 used to connect a telephone or telephone like station to a VMS 17 will include but not be limited to a private automatic branch exchange, an electronic automatic private branch exchange, a computerized branch exchange, a private branch exchange, a centrex telephone system, voice connecting arrangements, RS232, RS422, or like digital connecting means between an RS232 type port on a VMS 17 and a digital telephone like station, central off premise telephone switching stations and networks, or any like combination thereof. It is understood that it is contemplated by this invention that the voice mail system function control signal generating means 18 could be connected directly to the VMS without the intermediary of a telephone network.

The foot pedal switch assembly 11 is the preferred embodiment of the activation switch used to obtain "predominantly hands off" control of a VMS 17 while also enabling the user to have "predominantly hands on" control of another process or apparatus such as the keyboard of a typewriter, word processor or the like. Other activation switch embodiments that could replace the foot pedal switch assembly 11 include, but are not limited to the following: a handbar or elbow switch assembly; any other switch that can be controlled by other than the hand with reasonable accuracy; voice activated switch sensors; or activator switches placed directly on the keyboard of a computer used for data entry.

FIG. 2 illustrates a more detailed schematic representation of components provided for by the preferred embodiment of the present invention. Referring to FIG. 2, the telephone interface and DTMF generating circuitry 14 connects in series between a telephone handset 13 and a telephone set 15 through the "tip" (53 and 55) and "ring" (54 and 56) connections normally found between a telephone handset 13 and a telephone set 15.

In the preferred embodiment of the DTMF generating circuitry 14, there are seven terminals which are used to control the generation of DTMF tones. These seven terminals are shown as C1 45, C2 46, C3 47, R1 48, R2 49, R3 50, and R4 51 in FIG. 2 and are named from their association with the three "columns" (C1-C3) and the four "rows" (R1-R4) found on a standard telephone tone dialing keypad. A particular tone is generated when a "row" terminal is directly connected to a "column" terminal. For example, when C1 45 is directly connected to R1 48 then a DTMF tone associated with a "1" on the standard telephone tone dialing keypad is generated and transmitted through the DTMF generation and telephone interface circuitry 14. Similarly, by the appropriate connection of "row" and "column" terminals, all digits including "1", "2", "3", "4", "5", "6", "7", "8", "9", "0", "#", "*" can be generated and transmitted. It is understood that it is contemplated by the present invention that if a VMS is controllable by a digital signal other than a "touch tone," as described, then, the present invention is readily adaptable to generating the necessary digital signals to control the VMS functions in a "hands off" fashion. Instead of a DTMF generator 14, the voice mail system function control signal generating means would include circuitry which generates the appropriate digital signals corresponding to the particular VMS functions to be controlled. The digital signal generating circuitry would be coupled with the foot pedal interface circuitry. In such circumstance, the present invention is directly connectable to the VMS through a RS232 type port or the like in the VMS itself. The digital signals could also be transmitted to the VMS over the telephone network 16.

It is the preferred embodiment of the present invention to make a plurality of combinations of these terminals available to a user through the foot pedal interface circuitry 12. A user can then depress one of the foot pedal switches 20, 21 or 22 in the foot pedal switch assembly 11 and cause a DTMF tone to be generated and transmitted to a telephone set 15. The telephone set 15 is electronically linked to a VMS 17 through a telephone network system 16, so that generated tones will be transmitted from the telephone set 15 through the telephone network system 16 to the VMS 17 to control the various functions available from the VMS 17.

Referring again to FIG. 2, it is the preferred embodiment of the foot pedal interface circuitry 12 to consist of a plurality of relay circuits (29 and 32, 30 and 33, and 31 and 34) each of which causes the closure of an electrical link between user predefined "row" and "column" terminals (45 and 48, 45 and 49, 45 and 50, 45 and 51, 46 and 48, 46 and 49, 46 and 50, 46 and 51, 47 and 48, 47 and 49, 47 and 50, or 47 and 51) when a user depresses a foot pedal switch (20, 21 or 22). The result is the generation of a predefined DTMF control tone required to control a VMS 17 of FIG. 1.

The foot pedal assembly 11 essentially consists of three foot pedal switches: 20, 21 and 22, that each, when depressed by a user, will respectively close a common ground, 23, 24, or 25, to connective wires 26, 27 or 28 to complete the electronic circuit from positive voltage 35, 36 or 37 through each of the respective relay circuits 29 and 32, 30 and 33, or 31 and 34.

Each relay circuit consists of a relay and a diode as exemplified by relay 29 and diode 32. By pressing foot pedal switch 22, the magnetic relay coil contained in relay 32 builds up a magnetic field from the direct current flowing between the positive voltage 35 and ground 25. This magnetic field induced in the relay coil closes the movable contact switch and thereby connects terminals 39 and 40. Then, since terminal 39 will have been previously connected to a "column" type terminal (45, 46 or 47) and terminal 40 will have been connected to a "row" type terminal (48, 49, 50 or 51), the closure of the relay contact will generate and transmit the desired DTMF tone to permit the user the control of the desired VMS function. Since, as exemplified in FIG. 2, terminal 39 is connected to "column" C2 46 and terminal 40 is connected to "row" R1 48, depressing foot pedal switch 20 will generate and transmit a DTMF tone of "2" to a connected VMS. As an example, depending upon the particular VMS, a particular VMS function will be performed by the VMS when it receives a "2" tone. The "2" tone VMS function, for example, is the "skip back to the beginning" of the "oral mail." Since VMS is based upon computer controlled digital storage, the VMS will automatically skip back to the beginning of the "oral mail" as opposed to merely rewinding. Similarly, all other VMS functions can be controlled by assigning activation of a particular foot pedal to the generation of a particular voice mail system tone signal consisting of one or more appropriate tone, tones or sequence of tones and pauses, which signal corresponds to the desired VMS function in the VMS to which the user subscribes.

A typical VMS may have any of the following functions that the user can control through the above-mentioned generation of tones depending upon the correspondence between the tone and the function: Save oral mail, Erase oral mail, backup slightly within the oral mail, backup to the beginning, bookmark a place in the oral mail, go ahead slightly within message, go to the end of this oral mail, scroll forward to the next item of oral mail, scroll backward to the last item of oral mail, "Go to" a particular item of oral mail, Pause while listening to oral mail, call up time and date stamp of the oral mail, play oral mail continuously, adjust listening volume of oral mail, record a greeting, turn off a greeting, record a new item of oral mail, erase a new item of oral mail, archive an item of oral mail, end recording, immediately call the sender of oral mail, forward this oral mail, reply to oral mail, sign off the VMS or "exit", send oral mail with urgent delivery, send oral mail with normal delivery, send oral mail with future delivery, send oral mail with overnight delivery, batch send oral mail, check on oral mail sent, request a "return receipt", broadcast oral mail. Additional VMS functions not listed here are available and others may be introduced in the future.

Similarly, connecting terminals 41, 42, 43 and 44, to particular "column" and "row" terminals will enable a user to depress switches 21 or 22 and generate particular DTMF tones. As exemplified in FIG. 2 switch 21, when depressed, will generate an "*" since terminals 41 and 42 are connected to "column" C1 45 and "row" R4 51, respectively. Similarly, switch 22, when depressed will generate a "5" since terminals 43 and 44 are connected to "column" C2 46 and "row" R2 49, respectively. Thus, by previously defining the terminal connections between terminals 39–44 and terminals 45–51, the user need only depress a particular foot pedal switch to generate a particular DTMF tone. The internal impedance of a relay 32, 33 or 34 must be sufficient to limit the current, otherwise a limiting resistor in series with the respective relay coil must be added to each relay circuit. Each of the diodes 29, 30 and 31 are connected in parallel to the relay coil to suppress voltage spikes generated by the inductive kick produced by the coil.

The DTMF generating circuitry and telephone interface circuitry 14 is powered at terminal 38 with the same voltage source used to power terminal 35, 36 and 37 of the foot pedal interface circuitry 12. Also, the ground terminal 52 has a common connection with the other common ground terminal 23, 24 and 25.

Figure 3:
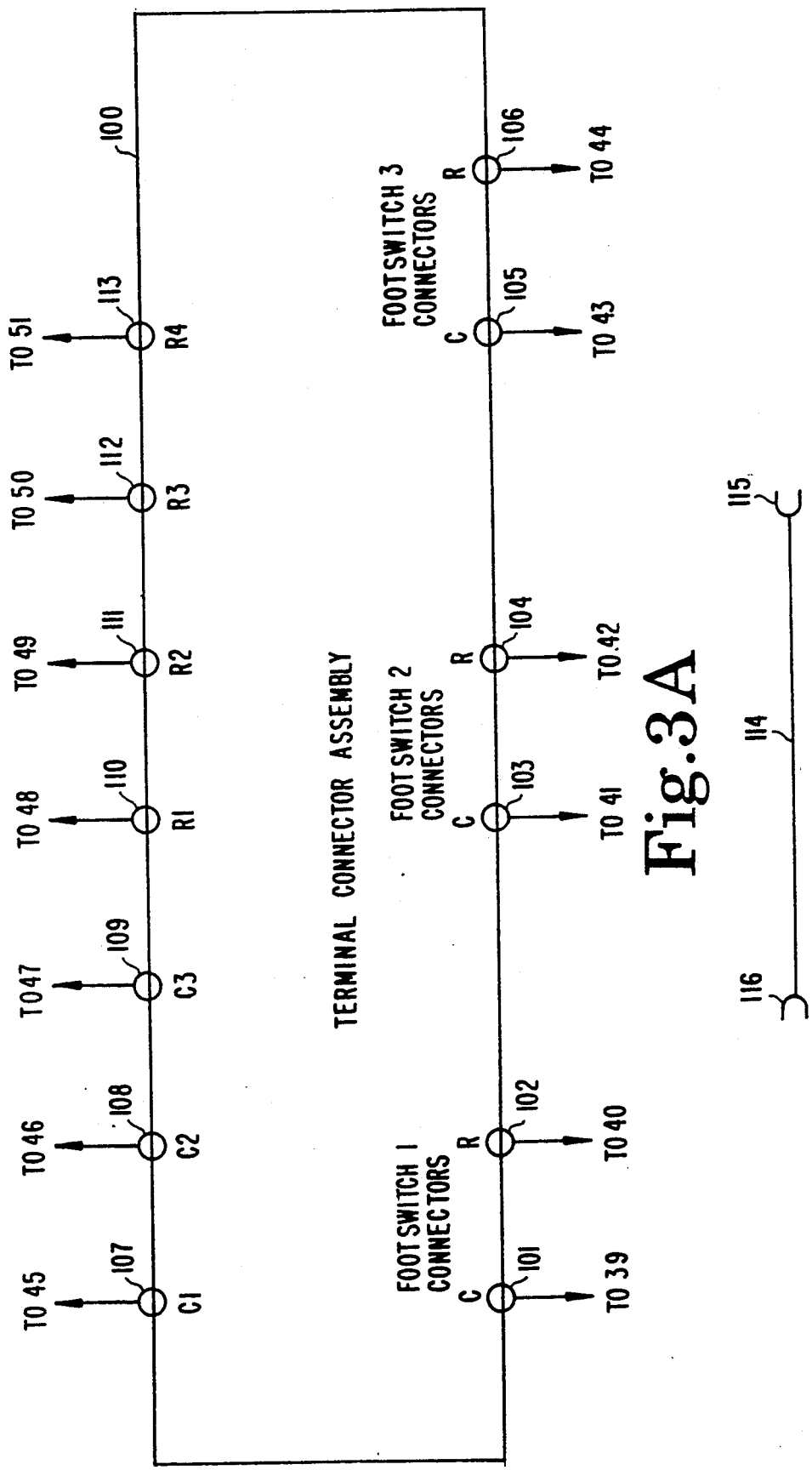
FIG. 3A is a partial schematic of the terminal interface assembly provided for by the preferred embodiment of the present invention.
FIG. 3B is a terminal connector wire for use with the terminal interface assembly of FIG. 3A.
Figure 4:
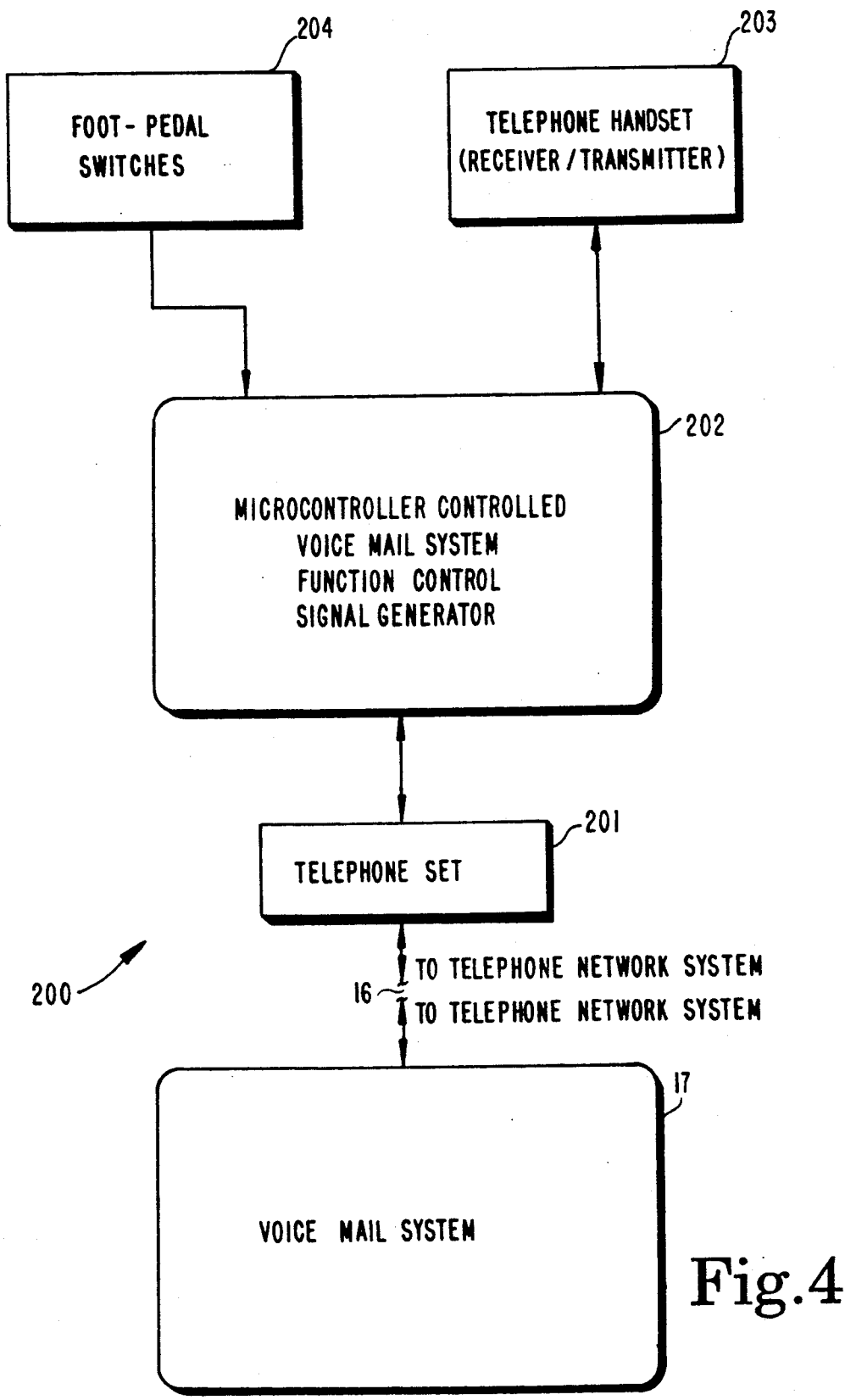
FIG. 4 is a block diagram which diagrammatically illustrates an alternate embodiment of the present invention.

FIG. 3 shows the preferred embodiment of terminal connector assembly 100 of the present invention. Terminal connector assembly 100 allows a user to reconfigure any foot pedal switch to select a particular DTMF tone. The simple design of terminal connector assembly 100 and of this invention allows a user, untrained in electronics, to redefine a foot pedal switch to a different DTMF tone without calling in a specially trained technician to reconfigure the foot pedal interface circuitry 50 of FIG. 2.

Footpedal switch terminals 101, 102, 103, 104, 105 and 106 or FIG. 3, respectively, are shown connected to foot pedal interface terminals 39, 40, 41, 42, 43 and 44 of FIG. 2, respectively. Similarly, terminal connectors 107, 108, 109, 110, 111, 112, 113 of FIG. 3, respectively, are shown connected top the associated DTMF generator terminals 45, 46, 47, 48, 49, 50 and 51 of FIG. 2, respectively. Since each terminal of the terminal connector assembly 100 of FIG. 3 has an adjustable screw, a user can connect both ends of a plurality of conductive "C" ends 115 and 116 of a plurality of terminal connector wires 114 to the proper terminals to complete a "row" or "column" type connection between the foot pedal interface circuitry 12 and the DTMF generation and telephone interface circuitry 14 shown in FIG. 2.

By using the terminal connector assembly 100 of FIG. 3 with a set of instructions, a user will readily connect a foot pedal switch from the foot pedal interface circuitry 12 of FIG. 2 to the DTMF generating and telephone interface circuitry 14 of FIG. 2 with the relative ease that a speaker is connected to a home stereo system. It is understood that the present invention contemplates that the changing of interconnections could also be done by electronic means such as providing the user with a programmable interface that can be digitally programmed to accomplish a change in pedal to VMS function relationship.

A second embodiment of a VMS control apparatus, according to the present invention, shown in FIGS. 4–11, enables an operator to control a Voice Mail System (hereinafter referred to as VMS) by a means that frees the user's hands for other tasks. Particularly, and referring to FIG. 4, the second or alternate embodiment 200 implements the footpedal 204 control of a VMS 17 by electronically interfacing the footpedal switches 204 through the microcontroller controlled footpedal interface unit 202. Unit 202 includes a Dual Tone Multifrequency (herein referred to as DTMF) tone generator, and telephone interface circuitry. This combined circuitry 202 is electronically coupled together between a telephone set 201 and a telephone handset 203 to enable a user through same handset 203 to receive or transmit voice messages or to enable the user, by pressing footpedal switches 204, to initiate transmission of control tones through any telephone network system 16 that can be used to connect a telephone to a VMS 17.

The telephone network system 16 used to connect a telephone or telephone like station to a VMS 17 will include but not be limited to a Private Automatic Branch Exchange, an Electronic Automatic Private Branch Exchange, a Computerized Branch Exchange, a Private Branch Exchange, Voice Connecting Arrangements, RS232, RS422, or like digital connecting means between an RS232 port on a VMS 17 and a digital telephone like station, central off premise telephone switching stations and networks, or any like combination thereof.

The footpedal switch assembly 204 is the preferred embodiment of the activation switch used to obtain "predominantly hands off" control of a VMS 17 while also enabling the user to have "predominantly hands on" control of another process or apparatus. Activation switch embodiments that replace the footpedal switch assembly 204 include, but are not limited to the following: a handbar switch assembly; voice activated switch sensors; computer, wordprocessor, or terminal keyboard means from surface keyboard switches or background software to enable a keyboard key as an activator switch; or other like means.

Figure 5A:
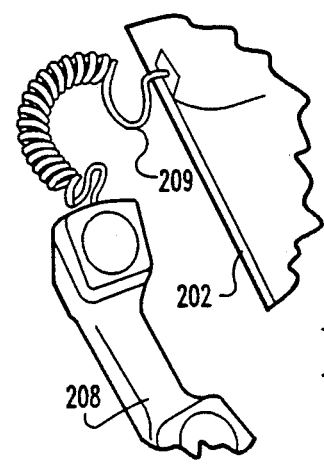
FIG. 5A depicts a standard handset connected to the main unit.
Figure 5:
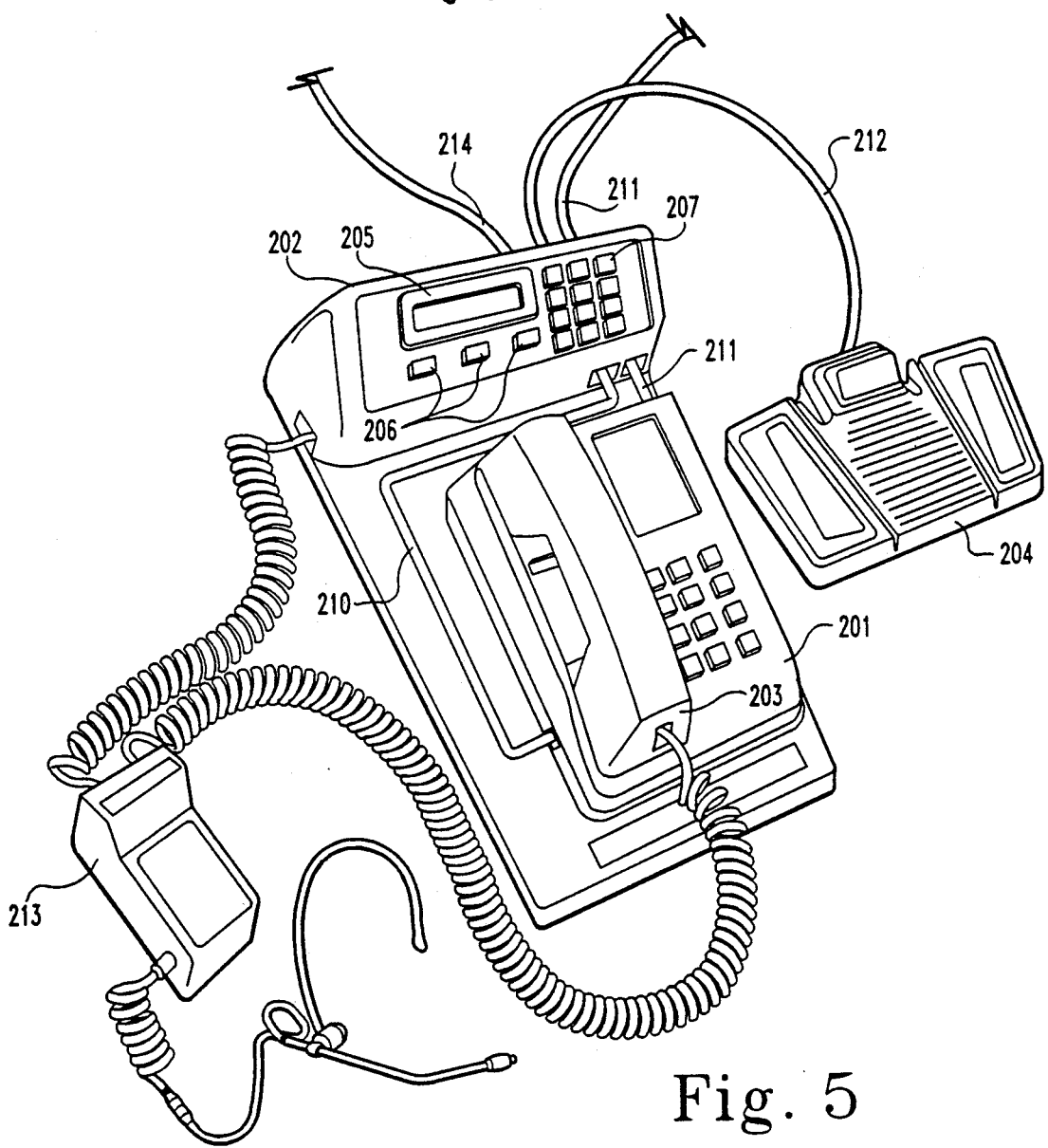
FIG. 5 is an isometric view of the alternate embodiment of FIG. 4 illustrating the various physical components of the system.

FIG. 5 illustrates an external view of the main unit 202 that is connected in series between a standard telephone set 201 and a telephone handset 203. The main unit 202 houses the microcontroller, the interface circuitry to the telephone set and handset, the interface circuitry to the footpedal, the DTMF generator, memory, and other related circuitry. Conveniently located on the main unit 202 are the LCD display 205, three softkey controls 206, and a telephone digit softkey pad 207 that includes the 12 telephone DTMF tone keys: "1," "2," "3," "4," "5," "6," "7," "8," "9," "0," "#," and "*."

FIG. 5A illustrates a handset 208 directly connected to the main unit 202 through line connection 209. Alternatively, a handset 203 can be connected to the main unit 202 through a headset 213 as illustrated in FIG. 5. The main unit 202 is connected to a telephone set 201 through a connecting line 210. The base cord 211, connecting the telephone set 201 to the outside telephone circuitry can be run through a tunnel or opening in the housing of the main unit 202.

In FIG. 5, the footpedal switches 204 are connected to the main unit 202 through the footpedal connecting line 212. A power cord 214 connects the base unit 202 to a standard 110 volt AC-to-9-volt-AC power adapter (not shown in FIG. 5).

Figure 6:
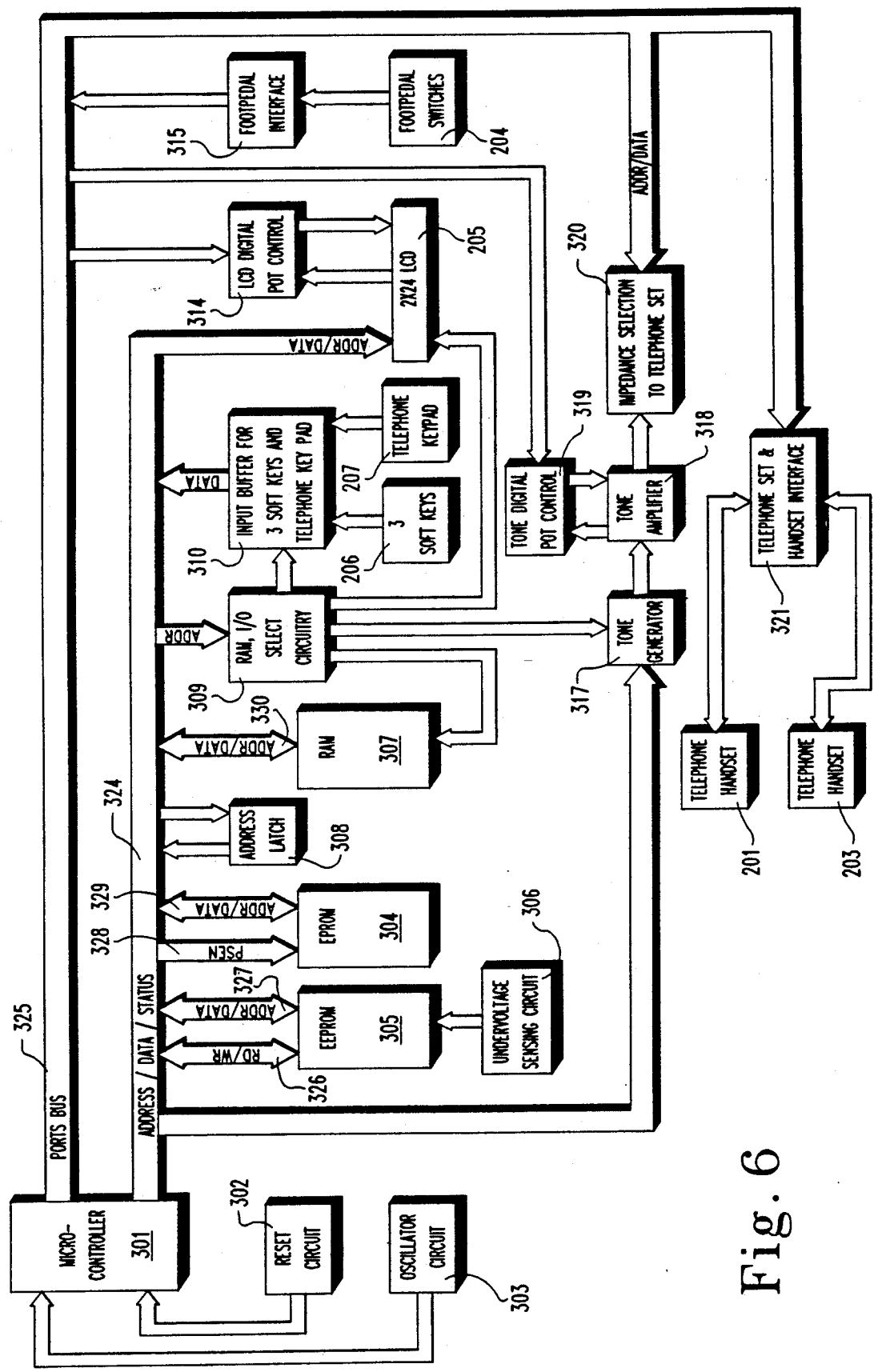
FIG. 6 is a block diagram which illustrates signal interfacing among the components of the embodiment of FIG. 4.

FIG. 6 is a detailed schematic representation of the components of the second embodiment of the invention. The microcontroller 301 provides the integration and control of all of the major circuit components in the system through the address/data and status lines 324 and port lines 325. Microcontroller 301 is clocked by the oscillator circuit 303 and a reset circuit 302 enables restarting of the program executed by the microcontroller 301.

The EPROM 304 is the source of program instructions for the microcontroller 301 and is connected to the address/data and status lines 329 and 324. Program instructions are supplied to the microcontroller 301 from the EPROM 304 when the PSEN line 328 is forced low. The PSEN line is a chip enable signal carrier. The EEPROM 305 is the nonvolatile memory for the system where user modifiable variables, sequences of DTMF tone control characters, and other permanent parameters are stored. The EEPROM 305 is connected to the microcontroller through address/data and status lines (327 and 324) and read/write lines 326 (Typical read/write signals, enable signals, address bus, and data bus signals are present on lines 324.). Connected to the EEPROM 305 is an undervoltage sensing circuit 306 which prevents data changes and thereby maintains the integrity of the data stored in the EEPROM 305 during low power conditions.

The RAM 307 is the external volatile memory for the system. There is also RAM memory internal to microcontroller 301. These two sources of RAM memory along with the memory registers internal to the microcontroller 301 provide the temporary memory for microcontroller 301 operations.

Since the data and lower 8 bits of the address are time multiplexed by the microcontroller 301 on the same lines 324, they require an address latch 308 to capture the address for the peripheral chips that are directly addressed by the microcontroller 301. Moreover, the RAM and I/O select circuitry 309 attaches to the microcontroller 301 through the address/data and status lines 324 to control the mapping of external data memory devices such as external RAM 307, the tone generator 317, the LCD display 205, and the input buffer 310 for the three softkeys 206 and telephone key pad 207.

A user interfaces with the microcontroller 301 by reading prompts displayed on the two line by 24 character LCD display 205 attached to the microcontroller 301 through address/data and status lines 324. A user then chooses prompted options, enters variable parameters, and data by pressing the 3 softkeys 206 or the twelve keys on the telephone keypad 207 of FIG. 6. The input buffer 310 for the 3 softkeys 206 and telephone keypad 207 hold data input by the user from softkeys 206 until the microcontroller 301 can read this data into RAM memory registers internal to the microcontroller 301.

Data and instructions are issued by the microcontroller 301 to the LCD display 205 through the address-/data and status lines 324. The contrast of the LCD display 205 can be adjusted with the LCD digital potentiometer control 314 connected through port lines 325 to ports on the microcontroller 301 where port commands are issued. The actual settings of the contrast are set by the user through the softkeys 206. The microcontroller 301 controls the LCD digital potentiometer control 314 through port lines 325.

The telephone set and handset interface 321 of FIG. 6 is a very flexible circuitry, comprised of a matrix of multiplexers, that forms the serial link between a telephone set 201 and telephone handset 203. In addition, the handset interface 321 provides access to the DTMF tone generator 317. The variable under user control that controls the telephone set and handset interface multiplexer connections 321 is named POLARITY.

FIG. 6 illustrates the connection of the 3 footpedal switches 204 that a user presses to initiate the transmission of DTMF tones into a telephone set 201. The three footpedal switches are linked to the microcontroller port lines 325 through the footpedal interface 315. Microcontroller 301 polls the port lines 325 and senses the closing of a footpedal switch 204 through the footpedal interface 315 and port lines 325.

If a sequence of DTMF tone control characters have been associated with a footpedal switch 204 by a user, a sequence of DTMF tones is generated by the DTMF tone generator 317 when the corresponding footpedal switch 204 is actuated by a user. The DTMF control characters are sent to the tone generator 317 from the mircrocontroller 301 through the address/data and status lines 324 to produce DTMF tones.

The DTMF tones generated by the tone generator 317 are amplified by the tone amplifier 318. The tone amplifier 318 has adjustable gain through the tone digital potentiometer control 319 that connects directly to the port lines 325 of the microcontroller 301. The variable under user control that sets the gain of potentiometer 319 is named TONE LOUDNESS.

The resulting amplified DTMF tone signals are impedance matched to the external telephone handset 203 for compatibility with the telephone set 201 through the impedance selection to telephone set circuitry 320. The impedance selection to telephone set circuitry 320 is a network of multiplexers and resistors that are controlled by the microcontroller 301 through the port lines 325. The variable under user control that sets the impedance selection to telephone set circuitry 320 is named IMPEDANCE.

FIG. 6 is a block circuit diagram of the second embodiment of the invention that allows a user, through microcontroller 301 control, to interface a footpedal DTMF tone generating device to a multiplicity of telephone set 201 and handset 203 types and transmit a sequence of DTMF tones through the telephone set 201 to control a VMS 17.

FIGS. 7, 8, 9 and 10 are flowcharts of the software or program routines executed by microcontroller 301. The software consists of a combination of timer interrupt and noninterrupt based routines executed by the microcontroller 301.

FIG. 7 illustrates the start/noninterrupt 401 routine of the software that begins upon power up reset of microcontroller 301. FIG. 7 together with FIG. 8 and FIG. 9 represent the bulk of the software and describe the noninterrupt control functions that interface with a user through the LCD display 205, the softkeys 206 and telephone keypad 207 of FIG. 5.

As the user makes choices from menus displayed in the LCD display 205 of FIG. 5, sets parameters for system variables, and defines footpedal activation responses, corresponding software flags are set in RAM memory internal to the microcontroller 301 of FIG. 6. Every 200 microseconds, a timer internal to the microcontroller 301 of FIG. 6 issues an interrupt to the system. Control is then passed to the 200 microsec. interrupt service routine of FIG. 10 which along with the 5 millisec driver routine of FIG. 11 reads the flags set during noninterrupt conditions. Each flag condition causes the microcontroller 301 of FIG. 6 to issue commands, read data from the peripheral hardware, or perform other hardware related tasks previously requested in the noninterrupt mode of the software. Other software flags are based upon the results of status polling of peripheral hardware during the interrupt routines before control is passed back to the noninterrupt routines.

It is the objective of the present invention that a combination of interrupt and noninterrupt software control be used to maintain the most efficient use of the microcontroller 301 of FIG. 6 for the best system response to the user.

FIG. 7 illustrates that after the initial power up, the first control step is to determine if the EEPROM 305 has been previously programmed with recognizable data. If the EEPROM 305 has never been used at step 402, then all the system variables must be set with default values. These default values are retrieved from EPROM 304 of FIG. 6 and stored in EEPROM 305. Then at step 404 of FIG. 7, stop characters are stored for each of the 9 footpedal POSITIONS, the 5 millisec counter in direct RAM memory is initialized, and the 200 microsec timer in the microcontroller 301 is initialized. Thereafter the system variables are retrieved from EEPROM 305 as is shown starting with step 406 of FIG. 7.

In step 403 of FIG. 7, the system variables are listed. TONE LOUDNESS is the name of the system variable that controls the gain of the DTMF tone emitted by the DTMF tone generator 317 of FIG. 6. POLARITY is the name of the system variable that controls the matrix of multiplexers that form the telephone set & handset Interface 321 of FIG. 6. IMPEDANCE is the name of the system variable that controls the impedance selection to telephone set 320 of FIG. 6. LCD BRIGHTNESS is the name of the variable that controls the contrast of the LCD display 205 through the LCD digital pot control 314 of FIG. 6. HANDSET TYPE is the name of the variable that has associated with it a POLARITY, an IMPEDANCE, and a TONE LOUDNESS. Hence, by choosing a HANDSET TYPE, a user at once selects three other system variables. POSITION 1, 2, 3, 4, 5, 6, 7, 8, or 9 is the name for a system memory variable that can be selected by a user. A user can assign to a POSITION variable array up to 40 characters that can include any combination of the 12 DTMF digits, 5 user definable PAUSE delay periods, and any number of TONE SPEED changes. When a footpedal switch 204 is pressed a position (1-9) is accessed and the DTMF tones are generated and transmitted. A PAUSE variable in the sequence of DTMF digits will delay the time between emitted DTMF digits by the time (in seconds) associated with the pause. The user can set a different time span or delay for each pause or use a default time that can also be set. The TONE SPEED variable defines the cadence of the emitted DTMF tone on and off sequence. Three TONE SPEEDs are available to the user and can be included in the 40 characters associated with a POSITION (1-9) variable array. THRESHOLD 1 and THRESHOLD 2 are user definable variables that set the footpedal time thresholds. POSITIONS 1, 2, and 3 associated with the left, middle, and right footpedals 204, respectively, are activated if a user presses and then releases a footpedal switch 204 prior or at a time set by THRESHOLD 1. POSITIONS 4, 5, and 6 are associated with the left, middle, and right footpedal switches 204, respectively, and are activated if a user presses and releases a footpedal switch 204 prior or at the time set by THRESHOLD 2 but after the time set by THRESHOLD 1. POSITIONS 7, 8, and 9 again associated with the left, middle, and right footpedal switches 204, respectively, are activated after pressing on a footpedal switch 204 in excess of the time set by THRESHOLD 2.

Next, at step 405 of FIG. 7, the microcontroller 301 initializes the LCD display 205 contrast level, through port line 325 control of the digital potentiometer 314, so LCD display 205 of FIG. 5 can be seen by the user.

Next, the main NONPROGRAM/FOOTPEDAL mode loop beginning at step 406 is executed. The POLARITY variable is read at step 407 from EEPROM 305 to control the telephone and hand set interface 321, through port commands, during execution of the next 5 millisec interrupt, described in detail beginning at step 710 of FIG. 10. TONE LOUDNESS is then read at step 408 from EEPROM 305. Next, the values of THRESHOLD 1 and THRESHOLD 2 are read at step 409 of FIG. 7 from EEPROM 305 and their binary equivalent are stored into memory of the microcontroller 301. The IMPEDANCE value is subsequently read at step 410 from EEPROM 305 and used to set the impedance selection to telephone set circuitry 320 during subsequent execution of the 5 millisec interrupt driver routine at step 710. The TONE SPEED is then read at step 411 from EEPROM 305 and the Tone on/Tone off binary cadence values are set and stored in the direct memory of the microcontroller 301. A display message from EPROM 304 is then selected at step 412 of FIG. 7. This message is scanned by the microcontroller for any control characters. The message control characters are interpreted and replaced by custom characters into an internal RAM buffer along with the other characters. The resulting message, appropriate softkey assignment prompts, and other display characters are then displayed at the next 200 microsec display interrupt.

It is desired to scan each display message for predefined control characters. If it is desirable to display any foreign language symbol, flashing symbol, or any other custom character, an association with the control character can be determined by this scanning process and the desired symbols can be selected by the user and displayed during execution of the next 200 microsec. display interrupt at step 700 et seq. of FIG. 10.

Two main paths in the software are taken depending on the results of hardware polling of the footpedal switches at step 413 and the three softkeys at step 419.

If a flag has been set at step 413 indicating an interrupt poll result of a footpedal switch 204 is closed, then the FOOTPEDAL POSITION TONE CONTROL step 414 is executed.

At step 415 the microcontroller begins to monitor how long the left, middle, or right footpedal switch 204 remain closed from the user pressing on a footpedal switch 204. When a closed footpedal switch 204 is released by the user, a flag is set by the 5 millisec. interrupt polling routine of FIG. 11. The final determination of the FOOTPEDAL POSITION (1-9) is determined at step 416 by the comparison with the THRESHOLD 1 and THRESHOLD 2 binary equivalents read from EEPROM 305.

The sequence of DTMF digits and control characters (e.g. PAUSE, TONE SPEED, and STOP - end of sequence) associated with the selected footpedal POSITION (1 to 9) are read from EEPROM 305 and converted at step 417 to a hexadecimal character appropriate for controlling the DTMF generator 317 and binary direct memory counters used to control DTMF cadence, PAUSES, TONE SPEED changes, and stops. Through flags set to inform the 5 millisec interrupt polling driver 710 of FIG. 10 (to control timing), the microcontroller, at step 418, issues the DTMF tone on, tone off, pause, and tone speed changes for the entire sequence of control and DTMF characters until a stop character is reached.

The FOOTPEDAL POSITION TONE CONTROL routine, steps 414-418, is now completed and control is passed back to the beginning of NONPROGRAM/FOOTPEDAL MODE at step 406. If no footpedal switch flag is set at step 413, then at step 419 the microcontroller checks for set flags from the three softkeys 206. If no softkey flags are set, since the user has not depressed a softkey 206, the program control returns to NONPROGRAM/FOOTPEDAL MODE step 406. However if a user has pressed one of the three softkeys 206, the 5 millisec driver of FIG. 11 will set appropriate flags to indicate to the microcontroller at step 419 to pass control to the PROGRAM USER CONTROLLED VARIABLES mode at step 420. It is in this mode that the user can select HANDSET TYPE values, assign DTMF digits to footpedal POSITIONS (1 to 9), and display or alter any of the other system control variables.

It is also in this mode that "help" display screens may be selected by the user for aid in understanding the meaning or purpose of each control variable.

Referring now to FIG. 8, the generic display: "VARIABLE NEXT EXIT" produced at step 500 represents the typical display prompt to a user. When a left, middle or, right softkey 206 is depressed, the user will select the VARIABLE, NEXT selection, or EXIT to a previous display, respectively. The term VARIABLE refers to any of the variables listed in step 403 which are subject to user control.

If a right softkey flag has been set during the 5 millisec. interrupt polling of hardware at step 710 et seq. in response to a user pressing a right softkey 206, program execution returns at step 501 to nonprogram/footpedal mode step 406.

If the middle softkey flag has been set by interrupt polling of hardware in steps 710 et seq. in response to a user pressing the middle softkey 206, then at step 502 the microcontroller 301 will respond to point to the next selectable variable 503 to be displayed at the next display interrupt at step 700.

If no softkey is selected, then at step 504 the microcontroller will respond to point to the variable currently displayed at step 505 and redisplay it at the next display interrupt at step 700 et seq. This loop continues until one of the three softkeys 206 is selected.

If the left softkey flag has been set during interrupt polling of hardware at step 710 et seq. in response to a user pressing the right softkey 206, the microcontroller at step 506 will read the value of the selected variable currently stored in EEPROM 305 into RAM memory and point to this value along with the variable name to be displayed at the next display interrupt at step 700 et seq. (e.g. TONE LOUDNESS=50).

Once a variable is selected by the user via softkey activation and a value is displayed, it may be altered by the user or the user may elect to leave the value unchanged and move to a different display. Typically, if a right softkey flag has been set during interrupt polling of hardware in the 5 millisec driver routine of FIG. 11 in response to a user pressing a right softkey 206, then at step 507 control is passed back to the beginning of PROGRAM USER CONTROLLED VARIABLES step 420.

Any of the softkeys 206, depending on the display context may have a variety of functions 508. Flags may be set from the interrupt polling of the hardware for any of the softkeys 206 or the digit keys on the telephone key pad 207. Depending on the display, softkeys: left, middle, and right, can have associated functions to backup or move forward one display character, toggle LCD brightness up or down, insert a pause within the sequence of tone digits, insert a tone speed change at any point in the sequence of tone digits, or save the value of the variable.

If a digit flag from the telephone keypad 207 has been set during execution of the interrupt polling to hardware routine of FIG. 11 in response to a user pressing a keypad digit key 207 to enter or modify a variable value or associated parameter, then at step 509 the microcontroller will detect this flag and store at step 510 a value into direct RAM memory to be displayed at the next display interrupt at step 700 et seq. and wait for the user to enter the next digit. Alternatively, the software is designed to wrap around to allow the user to reenter the first digit.

If a flag from a softkey 206 has been set by the interrupt polling routine of FIG. 11 in response to a user pressing a softkey 206 associated with a "BACKUP" display prompt, then at step 511 the microcontroller will detect this flag, point to the previous leftmost digit (with wrap around) in the display buffer at step 512 to be displayed for reentry at the next 200 microsec interrupt. Then, the microcontroller will wait at step 507 for the user to reenter the digit.

If a flag from a softkey 206 has been set during interrupt polling in response to a user pressing a softkey 206 associated with "UP" or "DOWN" LCD display contrast control, then at step 513 it is detected, and at step 514 a flag is set so that the 5 millisec interrupt driver of FIG. 11 will execute a port line 325 command to the LCD display contrast control 314 of FIG. 6.

Figure 10:
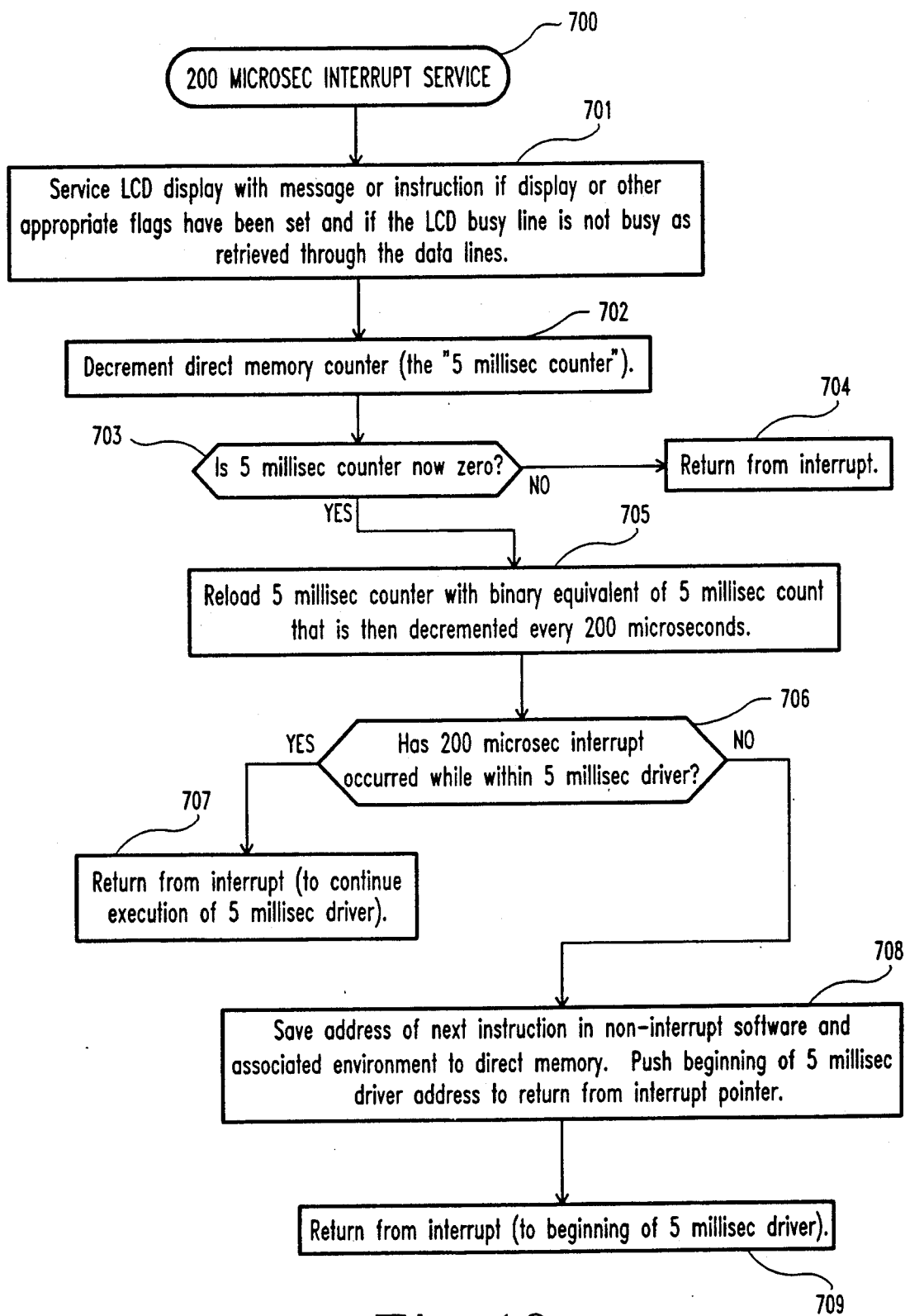
FIG. 10 is a flowchart of the 200 microsecond interrupt servicing software routine.

If the LCD display 205 is prompting the user to enter a POSITION 1 to 9 and a digit flag from the telephone keypad 207 has been set during interrupt polling in FIG. 11 in response to a user pressing a keypad digit key 207, then at step 600 the microcontroller will detect this flag and store a blank line into direct RAM memory to be displayed at the next 200 microsec service of FIG. 10 and wait for the user to enter digits, PAUSES, or other control characters. At step 600 et seq. the user enters or displays tone sequences associated with a footpedal switch POSITION (1 to 9).

In steps 600-612 the microcontroller will check for several possible DTMF digits and control characters entered by the user.

If a digit flag from the telephone keypad 207 has been set during interrupt polling in FIG. 11 in response to a user pressing a keypad digit key 207 to enter a DTMF tone digit, then at step 601 the digit flag is detected and at step 602 the value is stored into direct RAM memory to be displayed at the next display interrupt of FIG. 10. The microcontroller then waits for the user to enter the next digit or control character.

If a flag from a softkey 206 has been set during interrupt polling in FIG. 11 in response to a user pressing a softkey 206 associated with a "PAUSE" display prompt, then at step 603 the microcontroller 301 will detect this flag and store a PAUSE time (a default that is user modifiable) into direct memory at step 604 to be displayed at the next display interrupt of FIG. 10. The microcontroller will then wait for the user to enter the next digit or control character.

If a flag from a softkey 206 has been set during interrupt polling in FIG. 11 in response to a user pressing a softkey 206 associated with a "SLOW," "MEDIUM", or "FAST" TONE SPEED, then at step 605 the microcontroller 301 will detect this flag and store at step 606 a respective "S," "M," or "F" control character into direct RAM memory to be displayed at the next display interrupt. The microcontroller then waits for the user to enter the next digit or control character.

If a flag from a softkey 206 has been set during interrupt polling in response to a user pressing a softkey 206 associated with a "BACKUP" display prompt, then at step 607 a corresponding flag is detected which triggers the replacement of the previous leftmost digit in the display buffer with a blank character at step 608 to be displayed at the next display interrupt of FIG. 10. The microcontroller then waits for the user to reenter the blanked digit.

If a flag from a softkey 206 has been set during interrupt polling in response to a user pressing a softkey 206 associated with a "FORWARD" display prompt, the microcontroller 301 at step 609 will detect this flag and point to the next rightmost digit in the display buffer at step 610 to be displayed with the previous 23 digit and/or control character entries during the next display interrupt execution. Then, at step 601 and as detailed in step 507 the microcontroller waits for the user to enter another prompted softkey command.

In the second embodiment of the present invention, there are at most 40 combined digits and/or control characters (excluding the stop character) that can be entered into the display buffer in direct RAM memory. A digit entry, control character entry, "BACKUP" command, or "FORWARD" command will cause the 24 character display to appear to shift right or left to display portions of the 40 character display buffer in direct memory that are not currently viewed on the display 205.

Whether from the mode of digit entries for the POSITIONS 1 to 9 at step 600 or from any other variable parameter entry display, if a flag from a softkey 206 has been set during interrupt polling of hardware in response to a user pressing a softkey 206 associated with a "SAVE" display prompt, then at step 611 the microcontroller detects this flag, and at step 612 stores the value into direct memory to be stored to EEPROM 305 during subsequent execution of the 5 millisec interrupt driver of FIG. 11, load the display buffer with a message indicating a "SUCCESSFUL SAVE", to be displayed during execution of the next display interrupt, and pass control back to the beginning of the mode: PROGRAM USER CONTROLLED VARIABLES 420. This same saving Procedure is used to save all entered values of the variables plisted in step 403 of FIG. 7.

All flags set in the START/NONINTERRUPT 401 portion of the software, as has been herein described, are available in RAM memory internal to the microcontroller 301 for use by the interrupt software 700 of FIG. 10. The timer for the interrupt resides in the microcontroller 301 and after initialization produces a hardware interrupt every 200 microseconds. Program control is passed to the 200 MICROSEC INTERRUPT SERVICE routine 700 at each interrupt. It is the 200 MICROSEC routine and the associated 5 MILLISEC DRIVER of FIG. 11 that read the flags set under the START/NONINTERRUPT 401 software, issue commands, command and control hardware, retrieve and store data input from hardware, and set the flags used to control operations under the START/NONINTERRUPT 401 software.

The 200 MICROSEC INTERRUPT SERVICE routine at step 700 of FIG. 10 determines at step 701 if the LCD display 205 is busy, since it is a much slower device than the microcontroller. If it is not busy, than a message or instruction is transferred to the LCD display 205 through the address/data and status lines 324. In either instance, the "5 millisecond counter" is subsequently decremented at step 702 from an original 5 millisec binary equivalent. After decrementing the 5 millisec counter (a direct RAM memory location in the microcontroller 301) control is passed at step 704 back to the software that was interrupted if the 5 millisec counter is not zero.

In the event that the 5 millisec counter is equal to zero, a condition that occurs once every 5 milliseconds, the counter is reinitialized at step 705 to count down the next 5 milliseconds and a flag is checked at step 706 to determine if the 200 microsecond interrupt occurred while in the 5 MILLISEC DRIVER of FIG. 11. If the 200 microsecond interrupt did occur during execution of the 5 MILLISEC DRIVER, then control is passed directly back to the software control under the 5 MILLISEC DRIVER of FIG. 11 so that the hardware interface software can continue to perform all tasks specified by the current flag conditions. If the 200 microsec interrupt did not occur during execution of the 5 MILLISEC DRIVER of FIG. 11, then since the 5 millisec counter has just turned to zero, the current address under START/NONINTERRUPT software and the associated register environment is saved to direct RAM memory and the beginning address of the 5 MILLISEC DRIVER is positioned in memory at step 708 so that the subsequent return from interrupt at step 709 will transfer control to the 5 MILLISEC DRIVER routine at step 710.

The 200 microsec interrupt routine, beginning at step 700, is used to update the LCD display 205, and be effectively used as a timer for the 5 millisecond counter. The choice of interrupt design and functioning makes most efficient use of the microcontroller 301, a fast device, that must interface with many much slower devices. The interrupt design herein described frees the microcontroller 301 to attend to a plurality of tasks, many of which require rapid attention at unpredictable times, but may require attention over a relatively long span of time. With the second embodiment of the present invention, all of these difficult and seemingly self-contradictory design objectives are met.

Once in the 5 MILLISEC DRIVER 710 of FIG. 10, a flag test at step 711 is made to determine if the interrupted software was in NONPROGRAM/FOOTPEDAL MODE at step 406 et seq. or in the mode to PROGRAM USER CONTROLLED VARIABLES beginning at step 420.

If the firmware was executing in the mode PROGRAM USER CONTROLLED VARIABLES at steps 420–612 prior to the interrupt, then all three softkeys 206 and 12 keys of the telephone keypad 207 are read for closure from the address/data and status lines 324 through the input buffer for 3 softkeys and telephone keypad 310. Appropriate flags are set at step 712 of FIG. 10 corresponding to the keys that are closed so that this information can be passed back to software under the mode PROGRAM USER CONTROLLED VARIABLES at steps 420–612 after the return from the 5 millisec. driver at step 718.

If the software and microcontroller 301 were in the NONPROGRAM/FOOTPEDAL mode prior to the interrupt, then all three softkeys 206 are read and appropriate software key flags are set at step 713. Three footpedal switches 204: left, middle, and right are read for closure through the port lines 325 and the footpedal interface circuitry 315. Appropriate footpedal flags are set at step 714, and counters are initiated in direct memory to begin to time how long the footpedal switch 204 is closed. After a footpedal switch 204 is released or a timeout is matched with THRESHOLD 1 or THRESHOLD 2, a valid position or invalid noise is determined and the appropriate flags are set at step 714. Noise is considered to be a switch closure that is released prior to a predetermined time (e.g. 0.24 seconds). A short position, POSITIONs: 1(left), 2(middle), or 3(right), is a valid switch closure that is longer than noise, but less than or equal to the time value of THRESHOLD 1. A medium position, POSITIONs: 4(left), 5(middle), or 6(right), is a valid switch closure that is longer than THRESHOLD 1, but less than or equal to the time value of THRESHOLD 2. A long position, POSITIONs: 7(left), 8(middle), or 9(right), is a valid switch closure that is longer than the time value of THRESHOLD 2.

After a particular POSITION (1 to 9) has been determined at step 714, the sequence of DTMF Tones, PAUSE times, and TONE SPEED on/off cadences previously assigned to the selected POSITION are read at step 715 from EEPROM 305, stored in internal RAM memory counters, and/or used to control the DTMF tone generator 317. The sequence of DTMF tones and control characters are so executed and transmitted at step 715 through to the telephone set 201 and muted to the telephone handset 203 via the telephone set and handset interface circuitry 321 until the stop control character is encountered in the sequence of stored cadences.

Independent of the flag test at step 711 that determined if the interrupted routine was in NONPROGRAM/FOOTPEDAL MODE of steps 406 et seq. or in the mode to PROGRAM USER CONTROLLED VARIABLES of steps 420 et seq., certain flags are checked and the appropriate hardware is addressed and accessed at step 716. Depending on the context of the softkey, digit key, or automatic flags set in the noninterrupt software loops, DTMF tones are generated by the DTMF tone generator 317 in response to commands on the address/data and status lines 324, the LCD contrast is adjusted through port line 325 commands to the LCD digital potentiometer 314, the POLARITY and IMPEDANCE values are read from EEPROM 305 to set the Telephone set and handset interface 321 and the Impedance Selection to Telephone Set 320, respectively, through commands over the port lines 325, the TONE LOUDNESS values are read from EEPROM 305 to set the Tone digital potentiometer control 319 of the tone amplifier 318. All user controlled variables are read from EEPROM 305 and others are retained in EPROM 304. Software servicing for miscellaneous hardware support also occurs at step 716.

At step 717 the address of the noninterrupt software is loaded into the return from call pointer. This is the same address where the 200 microsecond interrupt occurred that passed control to the 5 MILLISEC DRIVER of FIG. 11. The associated stored environment is also restored at step 717 to prepare for the return from call at step 718. This allows the continuation of the noninterrupt software execution after the 5 MILLISEC DRIVER 710 is serviced. Thereafter, software execution resumes until interrupted again by the 200 microsecond interrupt signal.

Hence, FIGS. 7, 8, 9, 10, and 11 illustrate flow of the software within the EPROM 304 of FIG. 6. The software consists of a combination of timer interrupt and noninterrupt based instructions that guide the microcontroller operations.

Wherefore, while there have been described above the principals of this invention in connection with specific apparatus and techniques, it is to be clearly understood that this description is made only by way of an example and not as a limitation to the scope of the invention.

I claim:

1. A apparatus for hands off control by a user of an electronic voice mail system comprising:
   hands off pedal means having a plurality of pedals and electrical pedal switches, said hand off pedal means being for activating a particular electrical pedal switch corresponding to the activation by a user of a particular pedal;
   programmable voice mail control signal generating means electronically connected to said electrical pedal switches for generating voice mail system control signals, said generating means producing one of a plurality of voice mail system control signals in response to activation of any one of said electrical pedal switches, said signal generating means including keypad means for entering a plurality of sequences of DTMF tone signals, means for storing said plurality of sequences of DTMF tone signals and associating each of said sequences of DTMF tone signals with one of said electrical pedal switches and means for recalling one of said plurality of sequences of DTMF tone signals which correspond to a particular one of said plurality of voice mail system control signals in response to closure of a corresponding one of said pedal switches; and
   voice mail system means for receiving said voice mail system control signals to perform voice mail functions corresponding thereto, said voice mail system means being electronically connected to said voice mail control signal generating means to receive said voice mail system control signals via a telephone communication link.

2. An apparatus for hands off control by a user of an electronic voice mail system comprising:
   hands of pedal means having a plurality of pedals and electrical pedal switches, said hands off pedal means being for activating a particular electrical pedal switch corresponding to the activation by a user of a particular pedal;
   processor means connected to said pedal means, said processor means including data memory means for storing and recalling data, and I/O means for interfacing to peripheral componentry such as said hands off pedal means, said processor means producing a plurality of voice mail system control signals wherein each of said control signals is produced in response to activation of one of said switches, said processor means supplying said control signals to a handset connector and a telephone set connector; and
   voice mail system means for receiving said voice mail system control signals to perform voice mail functions corresponding thereto, said voice mail system means being electronically connected to said processor means to receive said voice mail system control signals via a telephone communication link.

3. The apparatus of claim 2 including:
   keyboard means for entering data;
   display means for displaying alphanumeric information;
   wherein said processor means is connected to said keyboard means and said display means, and wherein said voice mail system control signals are user selectable and programmable through said keyboard means to be produced in response to activation of said switches.

4. The apparatus of claim 3 wherein prompts are displayed on said display means by said processor means to instruct the user in programming said processor means to produce said voice mail system control signals.

5. The apparatus of claim 4 wherein said processor means is programmable to produce a sequence of voice mail system control signals and supply said sequence of voice mail system control signals to said handset connector and said telephone set connector in response to activation of said switches.

6. The apparatus of claim 5 including nonvolatile memory means for storing and subsequent recall of said voice mail system control signals and said sequence of voice mail system control signals.

7. The apparatus of claim 5 wherein said process means, in response to user commands entered via said keyboard means, inserts variable length delay periods between control signals when said processor means produces said sequence of control signals.

8. The apparatus of claim 7 wherein said processor means is programmable, via said keyboard means, to produce said sequence of control signals at one of several predetermined and user selectable cadences.

9. The apparatus of claim 8 wherein said control signals and said sequence of control signals are DTMF signals.

10. The apparatus of claim 9 wherein said processor means includes programmable interface circuits connected to and controlled by said processor means, said interface circuits also connected to said handset connector and said telephone set connector and providing proper impedance matching between said processor means and said telephone communication link.

11. The apparatus of claim 10 wherein the amplitude of said control signals, the polarity of said control signals, and said interface circuits are programmed to a predetermined setting in response to user selection via said keyboard means, and wherein said keyboard means is a part of a handset.

12. The apparatus of claim 3 wherein said processor means produces a first and a second control signal in response to activation of one of said switches, said first control signal produced in response to a brief activation of one of said switches and said second control signal produced in response to a prolonged activation of one of said switches.

13. The apparatus of claim 12 wherein said control signals are DTMF signals.

14. The apparatus of claim 13 wherein said control signals are sequences of DTMF control signals.

15. The apparatus of claim 14 wherein the user selects and enters said sequences of DTMF control signals via said keyboard means in response to prompts displayed on said display means by said processor means.

16. The apparatus of claim 15 wherein said sequence of DTMF control signals includes user programmable pauses therebetween, said pauses being programmable via said keyboard means, and said processor means includes nonvolatile memory means for storing and recalling user selectable and programmable information such as control signals, sequences of control signals, and sequences of control signals and pauses.

17. The apparatus of claim 16 wherein said pauses are variable in length and selectably programmable by the user via said keyboard means.

18. The apparatus of claim 16 wherein said nonvolatile memory means is an EEPROM memory device, and said data memory means includes ROM and RAM.

* * * * *

UNITED STATES PATENT AND TRADEMARK OFFICE
CERTIFICATE OF CORRECTION

PATENT NO. : 5,128,982

DATED : July 7, 1992

INVENTOR(S) : Dugdale, et al

It is certified that error appears in the above-identified patent and that said Letters Patent is hereby corrected as shown below:

In column 1, line 8, please delete "5,048," and insert in lieu thereof —5,048,074—.

In column 5, line 22, please delete "7 is" and insert in lieu thereof --7A and 7B are--.

Figure 8B:
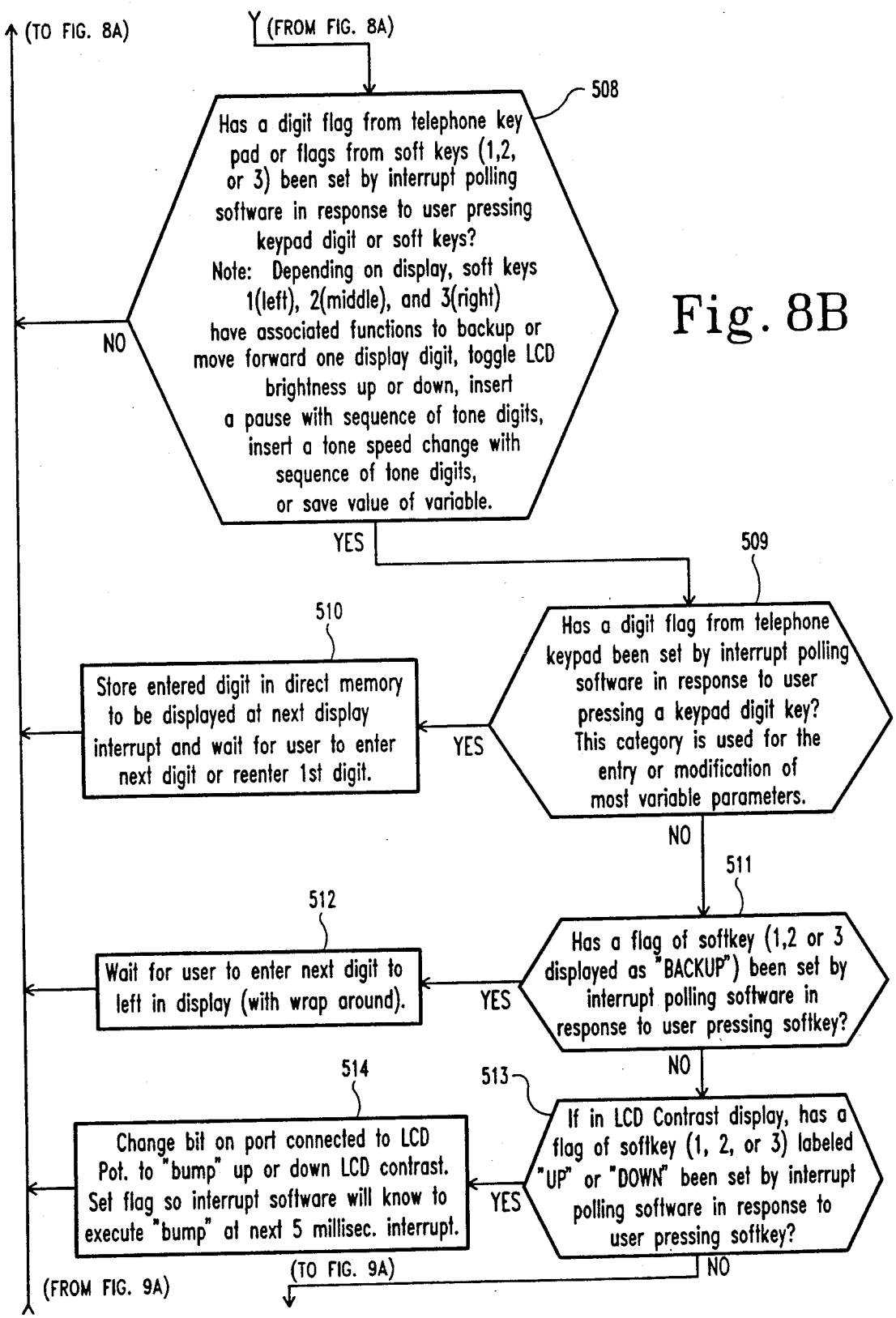
FIG. 8 is a flowchart for the software which enables the user to program user controlled options for the system of FIGS. 5 and 6.

In column 5, line 24, please delete "FIG. 8 is" and insert in lieu thereof —FIGS. 8A and 8B are--.

Figure 9A:
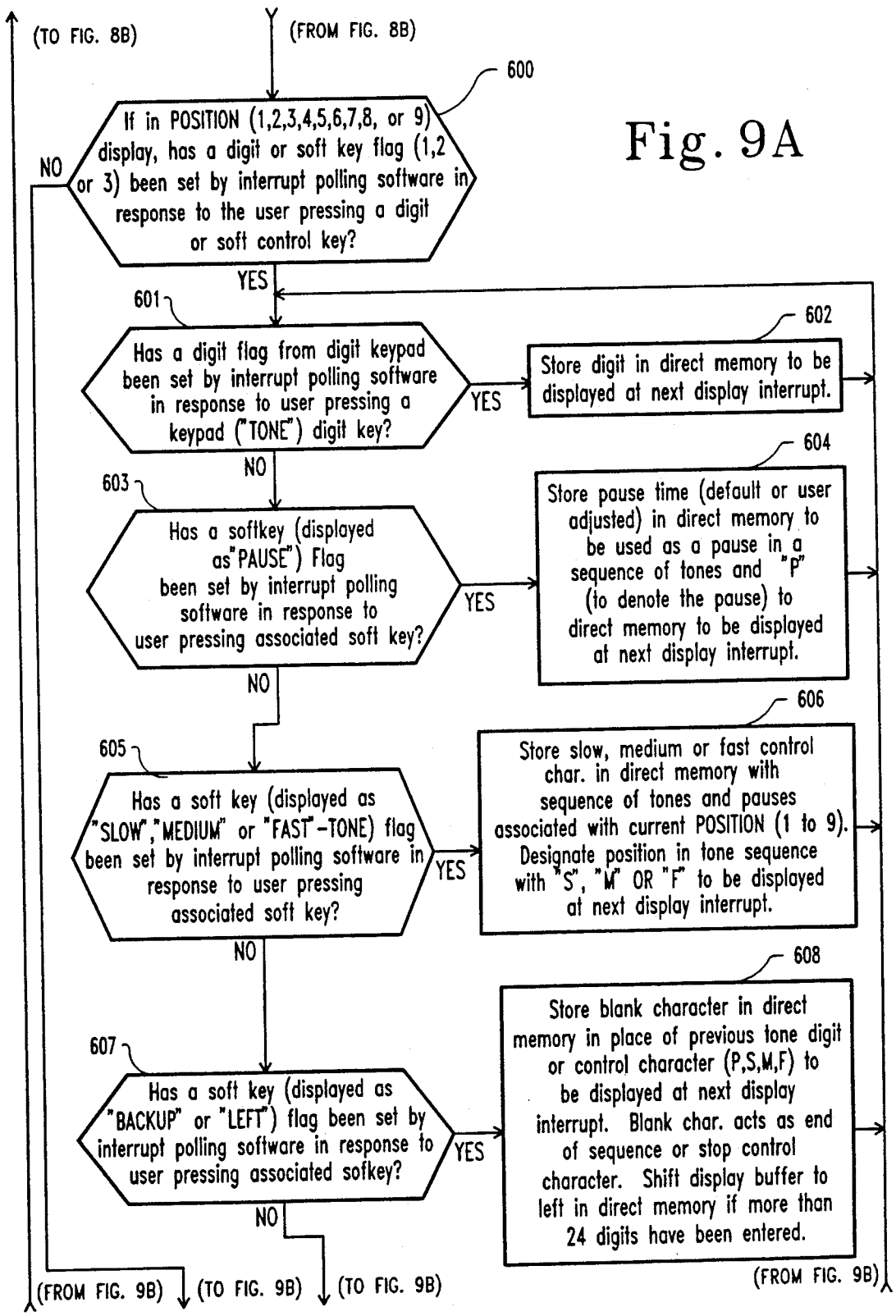
FIG. 9 is a continuation of the flowchart of FIG. 8.
Figure 9B:
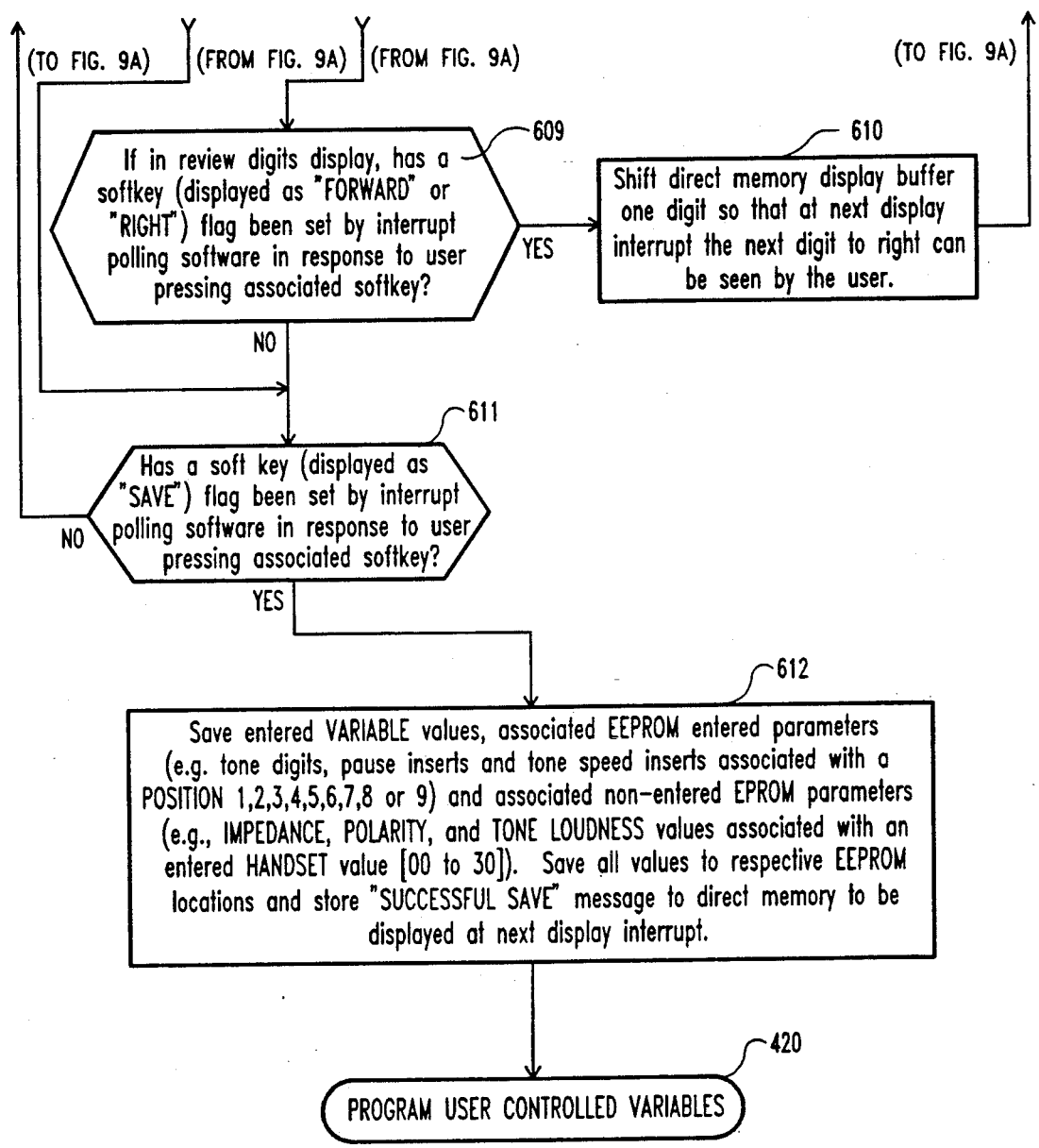

In column 5, line 27, please delete "FIG. 9 is" and insert in lieu thereof —FIGS 9A and 9B are--.

In column 5, line 27, please delete "FIG. 8" and insert in lieu thereof —FIGS. 8A and 8B--.

Figure 11A:
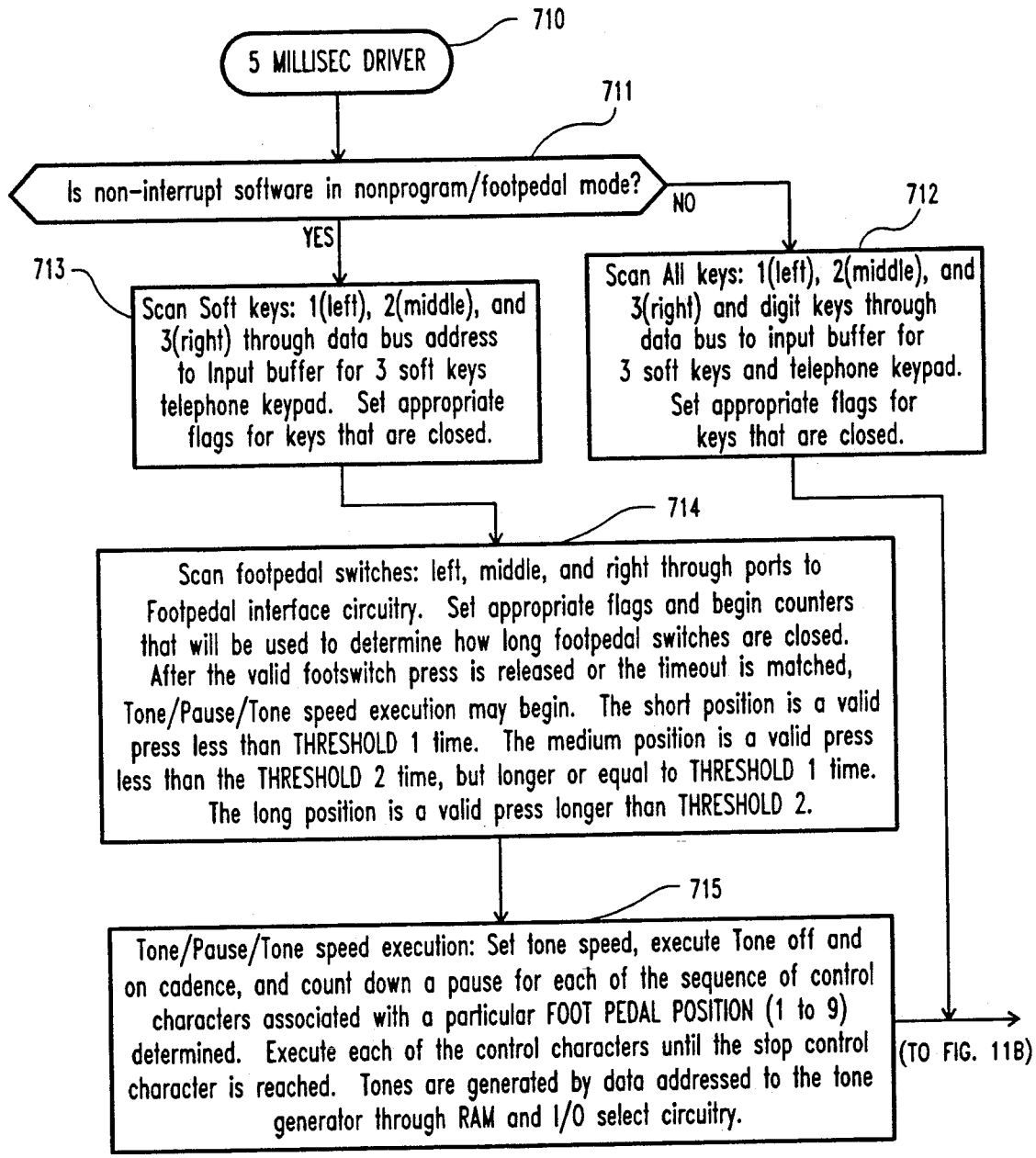
FIG. 11 is a flowchart of the 5 millisecond driver routine.
Figure 11B:
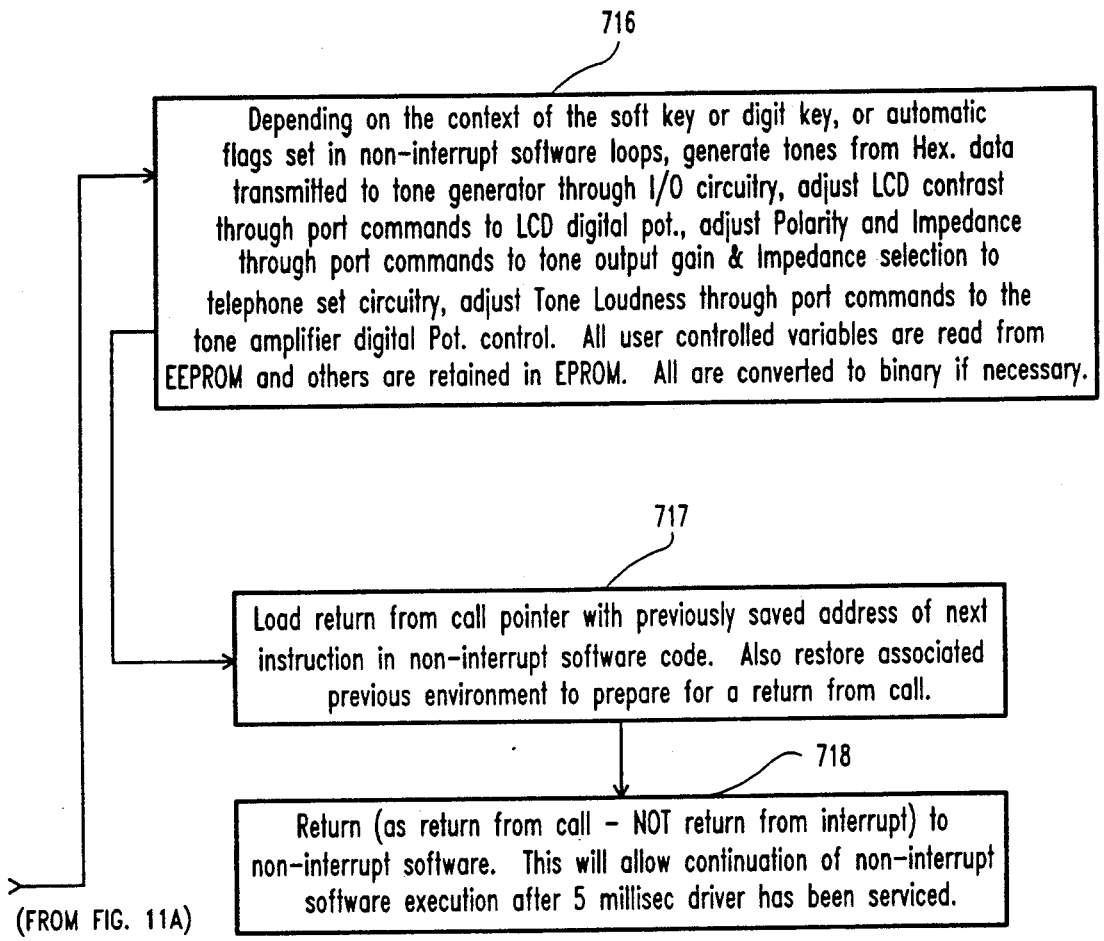

In column 5, line 30, please delete "FIG. 11 is" and insert in lieu thereof —FIGS. 11A and 11B are--.

In column 11, line 66, please delete "7, 8, 9 and 10" and insert in lieu thereof --7A, 7B, 8A, 8B, 9A, 9B, 10, 11A and 11B--.

Figure 7A:
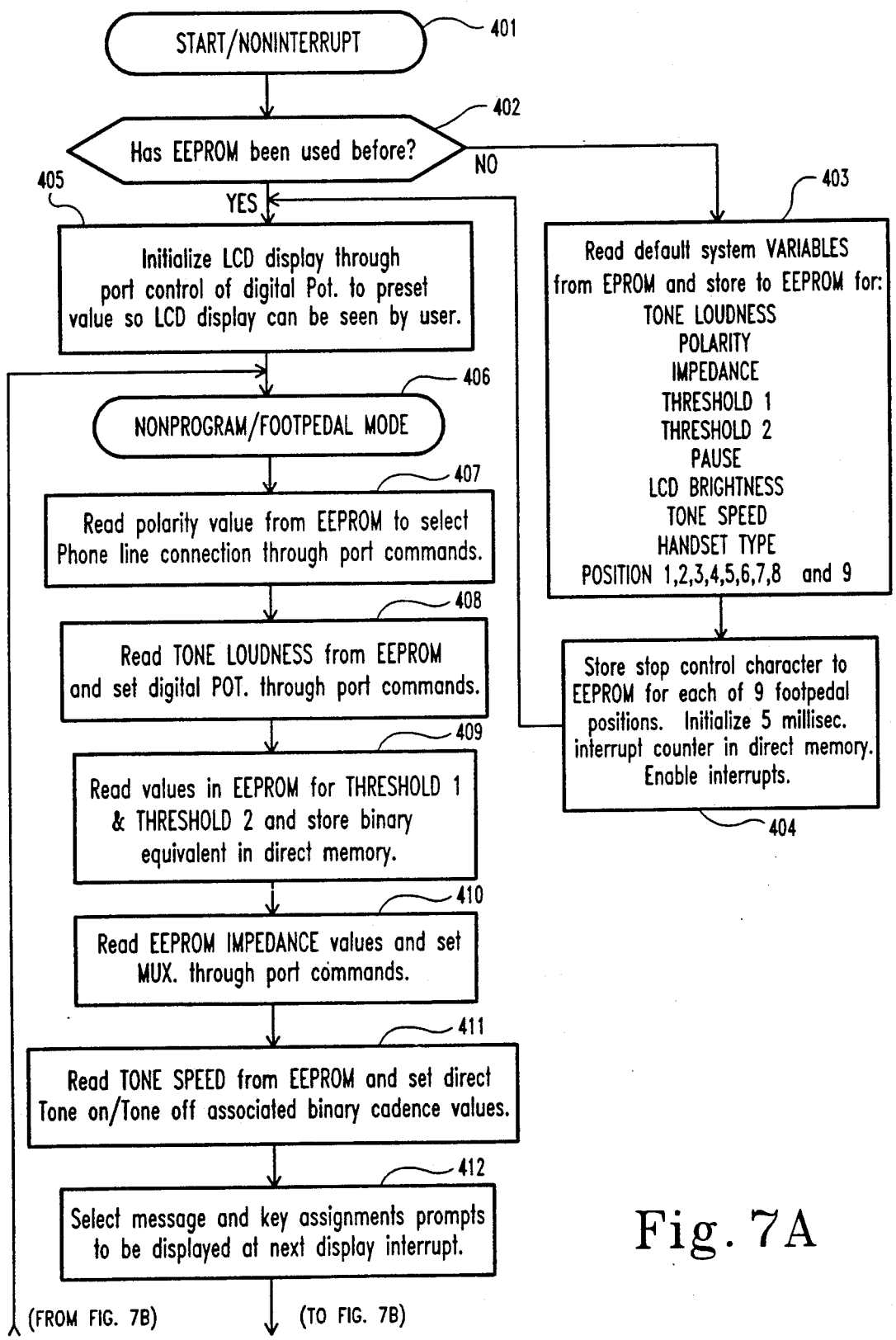
FIGS. 7 is a flowchart for the start/noninterrupt routine of the software of the alternate embodiment.
Figure 7B:
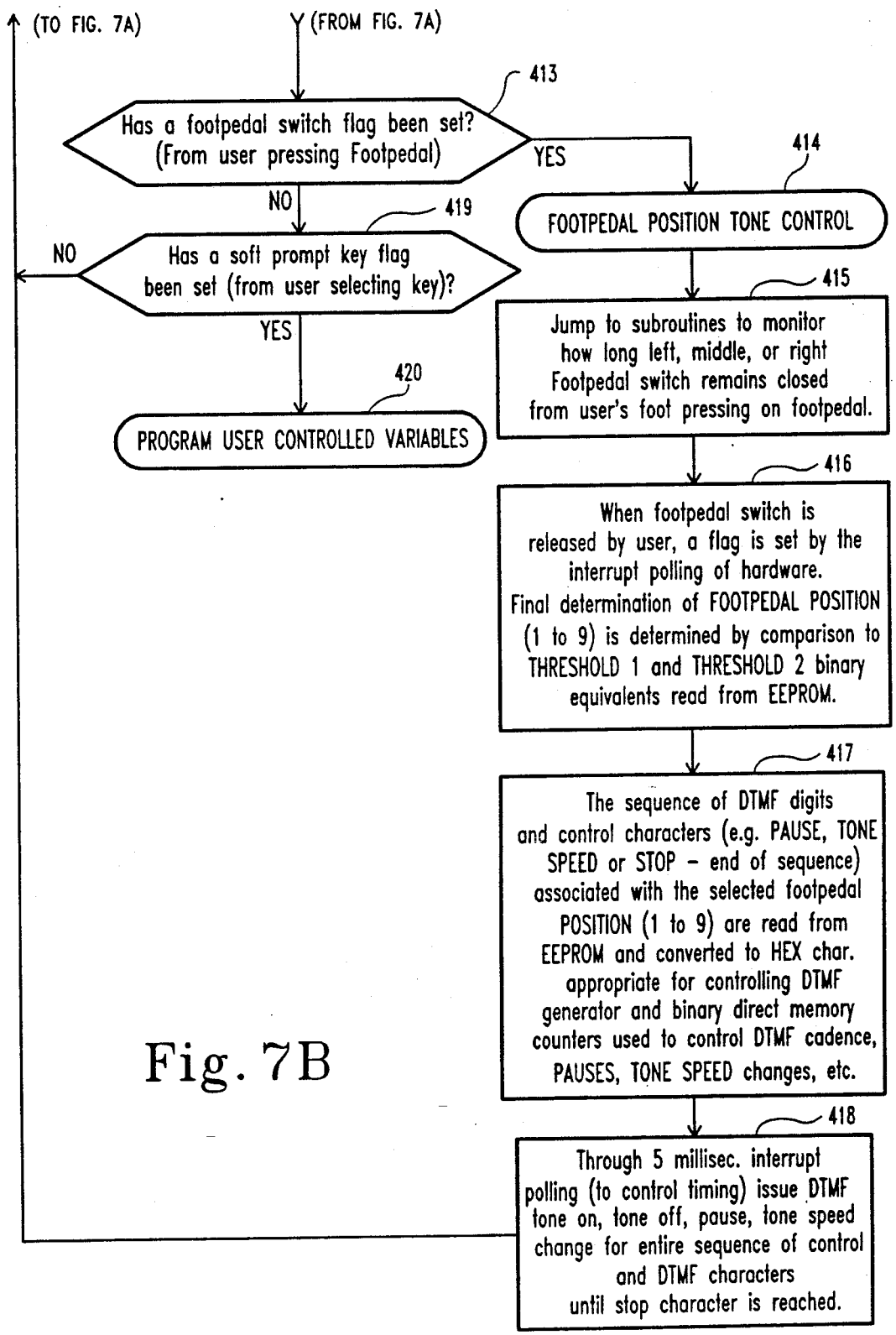

In column 12, line 3, please delete "FIG. 7 illustrates" and insert in lieu thereof —FIGS. 7A and 7B illustrate--.

In column 12, lines 5-6, please delete "FIG. 7 together with FIG. 8 and FIG. 9" and insert in lieu thereof —FIGS. 7A and 7B together with FIGS. 8A, 8B, 9A and 9B--.

In column 12, line 19, please delete "FIG. 11" and insert in lieu thereof —FIGS. 11A and 11B--.

In column 12, line 33, please delete "FIG 7 illustrates" and insert in lieu thereof —FIGS. 7A and 7B illustrate--.

In column 12, line 40, please delete the phrase "of FIG. 7".

In column 12, lines 45-46, please delete the phrase "of FIG. 7".

In column 12, line 47, please delete the phrase "of FIG. 7".

In column 13, line 27, please delete the phrase "of FIG. 7".

In column 13, line 37, please delete "10" and insert in lieu thereof —11A—.

In column 13, line 50, please delete the phrase "of FIG. 7".

In column 14, line 10, please delete "FIG. 11" and insert in lieu thereof —FIGS. 11A and 11B--.

In column 14, line 24, please delete the phrase "of FIG. 10".

UNITED STATES PATENT AND TRADEMARK OFFICE
CERTIFICATE OF CORRECTION

PATENT NO. : 5,128,982

DATED : July 7, 1992

INVENTOR(S) : Dugdale, et al

It is certified that error appears in the above-identified patent and that said Letters Patent is hereby corrected as shown below:

In column 14, line 39, please delete "FIG. 11" and insert in lieu thereof —FIGS. 11A and 11B—.

In column 14, line 50, please delete "FIG. 8" and insert in lieu thereof — FIGS. 8A and 8B—.

In column 15, line 19, please delete "FIG. 11" and insert in lieu thereof —FIGS. 11A and 11B—.

In column 15, line 37, please delete "FIG. 11" and insert in lieu thereof —FIGS. 11A and 11B—.

In column 15, line 47, please delete "FIG. 11" and insert in lieu thereof —FIGS. 11A and 11B—.

In column 15, line 60, please delete "FIG. 11" and insert in lieu thereof —FIGS. 11A and 11B—.

In column 15, line 64, please delete "FIG. 11" and insert in lieu thereof —FIGS. 11A and 11B—.

In column 16, line 9, please delete "FIG. 11" and insert in lieu thereof —FIGS. 11A and 11B—.

In column 17, line 4, please delete "FIG. 11" and insert in lieu thereof —FIGS. 11A and 11B—.

In column 17, line 9, please delete "Procedure" and insert in lieu thereof —procedure—

In column 17, line 10, please delete "plisted" and insert in lieu thereof —listed—.

In column 17, line 11, please delete "of FIG. 7".

In column 17, line 22, please delete "FIG. 11" and insert in lieu thereof —FIGS. 11A and 11B—.

In column 17, line 46, please delete "FIG. 11" and insert in lieu thereof —FIGS. 11A and 11B—.

In column 17, line 54, please delete "FIG. 11" and insert in lieu thereof —FIGS. 11A and 11B—.

In column 18, line 8, please delete "10" and insert in lieu thereof —11A—.

In column 18, line 21, please delete "10" and insert in lieu thereof —11A—.

UNITED STATES PATENT AND TRADEMARK OFFICE
CERTIFICATE OF CORRECTION

PATENT NO. : 5,128,982
DATED : July 7, 1992
INVENTOR(S) : William P. Dugdale

It is certified that error appears in the above-identified patent and that said Letters Patent is hereby corrected as shown below:

In column 19, line 23, please delete "FIG. 11" and insert in lieu thereof —FIGS. 11A and 11B—.

In column 19, line 30, please delete "7, 8, 9, 10, and 11" and insert in lieu thereof —7A, 7B, 8A, 8B, 9A, 9B, 10, 11A and 11B—.

In column 20, line 55, please delete "process" and insert in lieu thereof —processor—.

Signed and Sealed this

Eighteenth Day of January, 1994

Attest:

BRUCE LEHMAN

Attesting Officer

Commissioner of Patents and Trademarks